US012580087B2

(12) United States Patent
Thompson et al.

(10) Patent No.: US 12,580,087 B2
(45) Date of Patent: Mar. 17, 2026

(54) IN SITU RENEWABLE ELECTRODE FOR Z-PINCH PLASMA CONFINEMENT SYSTEM

(71) Applicant: ZAP ENERGY, INC., Seattle, WA (US)

(72) Inventors: Matthew Colin Thompson, Mukilteo, WA (US); Benjamin Joseph Levitt, Seattle, WA (US)

(73) Assignee: Zap Energy, Inc., Everett, WA (US)

( * ) Notice: Subject to any disclaimer, the term of this patent is extended or adjusted under 35 U.S.C. 154(b) by 384 days.

(21) Appl. No.: 18/101,086

(22) Filed: Jan. 24, 2023

(65) Prior Publication Data

US 2023/0238154 A1 Jul. 27, 2023

Related U.S. Application Data

(60) Provisional application No. 63/303,477, filed on Jan. 26, 2022, provisional application No. 63/303,473, filed on Jan. 26, 2022.

(51) Int. Cl.
*G21B 1/05* (2006.01)
*G21B 1/11* (2006.01)

(52) U.S. Cl.
CPC .................. *G21B 1/05* (2013.01); *G21B 1/11* (2013.01)

(58) Field of Classification Search
None
See application file for complete search history.

(56) References Cited

U.S. PATENT DOCUMENTS 3,715,595 A 2/1973 Josephson
11,744,001 B2 * 8/2023 Meier ...................... H05H 1/06 315/111.21
11,758,640 B2 * 9/2023 Shumlak .................. G21B 1/21 315/111.61

(Continued)

FOREIGN PATENT DOCUMENTS

JP S61292842 A 12/1986

OTHER PUBLICATIONS

The International Searching Authority, "Search Report and Written Opinion" in Application No. PCT/US2023/061193, Jun. 30, 2023, 17 pages.

(Continued)

*Primary Examiner* — Srinivas Sathiraju
(74) *Attorney, Agent, or Firm* — Davis Wright Tremaine LLP

(57) ABSTRACT

Methods and systems are provided for Z-pinch plasma and other plasma confinement utilizing various electrode compositions and configurations. In one example, a plasma confinement system includes a plurality of electrodes, each electrode of the plurality of electrodes arranged coaxially with respect to an assembly region of the plasma confinement system and positioned so as to be exposed to the assembly region, wherein one or more electrodes of the plurality of electrodes includes an electrode material which releases hydrogen gas above a threshold temperature. In an additional or alternative example, a plasma confinement system includes an electrode body including a nosecone, and a liquid metal, a portion of the liquid metal forming a protective film between a surface of the nosecone and an exterior of the nosecone during operation of the plasma confinement system.

20 Claims, 12 Drawing Sheets

(56) References Cited

U.S. PATENT DOCUMENTS

| | | | | |
|---|---|---|---|---|
| 12,127,324 | B2* | 10/2024 | Shumlak | G21B 1/05 |
| 12,183,556 | B2* | 12/2024 | Stoltz | H01J 37/32064 |
| 12,283,468 | B2* | 4/2025 | Stoltz | H01J 37/32064 |
| 2008/0272317 | A1 | 11/2008 | Shumlak et al. | |
| 2014/0093897 | A1* | 4/2014 | Szeto | A61P 43/00 205/780.5 |
| 2015/0294743 | A1* | 10/2015 | Zheng | G21B 1/15 376/107 |
| 2017/0309455 | A1 | 10/2017 | Yoshimura et al. | |
| 2019/0277268 | A1 | 9/2019 | Nikic et al. | |
| 2020/0058411 | A1 | 2/2020 | Shumlak et al. | |
| 2020/0168350 | A1 | 5/2020 | Shumlak et al. | |
| 2022/0117072 | A1 | 4/2022 | Shumlak et al. | |
| 2022/0205079 | A1 | 6/2022 | Fukarek et al. | |
| 2022/0392651 | A1 | 12/2022 | Meier et al. | |
| 2022/0394838 | A1* | 12/2022 | Shumlak | G21B 1/21 |
| 2022/0394839 | A1* | 12/2022 | Shumlak | G21B 1/05 |
| 2022/0394840 | A1* | 12/2022 | Meier | G21B 1/21 |
| 2023/0238153 | A1* | 7/2023 | Levitt | G21B 1/05 376/144 |
| 2023/0238154 | A1* | 7/2023 | Thompson | G21B 1/05 376/100 |
| 2023/0377762 | A1* | 11/2023 | Stoltz | H01J 37/32064 |
| 2024/0212994 | A1* | 6/2024 | Stoltz | H01J 37/32064 |
| 2024/0321469 | A1* | 9/2024 | Parga | C22C 11/06 |

OTHER PUBLICATIONS

The International Searching Authority, "Search Report and Written Opinion" in Application No. PCT/US2023/061196, Jun. 30, 2023, 20 pages.

Forbes, E. G. et al., "Progress Toward a Compact Fusion Reactor Using the Sheared-Flow-Stabilized Z-Pinch", Fusion Science and Technology, Jul. 3, 2019, 10 pages.

Levitt, B., et al., "Zap Energy Sheared-Flow-Stabilized Z-Pinch Reactor Results and Concept", 2022 IEEE International Conference on Plasma Science (ICOPS), Seattle, WA, USA, May 2022, 1 page.

Thompson, Matthew C., et al., "Summary of Power Handling Systems Development at Zap Energy", 63rd Annual Meeting of the APS Division of Plasma Physics, vol. 66, No. 13, Nov. 2021, 1 page.

Claveau, Elliot, et al., Observation of a Stagnation Wave in the Fusion Z-pinch Experiment (FuZE), 62nd Annual Meeting of the APS Division of Plasma Physics, vol. 65, No. 11, Submitted Jun. 29, 2020, 1 page.

Mitrani, James M., et al., "Evidence for Thermonuclear Neutron Production on a Sheared-flow Stabilized (SFS) Z-pinch", 61st Annual Meeting of the APS Division of Plasma Physics, vol. 64, No. 11, Submitted Jul. 3, 2019, 1 page.

Claveau, Elliot, et al., "Control of Sheared Flow Stabilized Z-pinch Properties with Electrode Geometry", 61st Annual Meeting of the APS Division of Plasma Physics, vol. 64, No. 11, Oct. 2019, 1 page.

Claveau, Elliot, et al., "Observation and Analysis of Thermonuclear Neutron Production in a Sheared-flow-stabilized Z-pinch", 60th Annual Meeting of the APS Division of Plasma Physics, vol. 63, No. 11, Nov. 2018, 1 page.

Mitrani, James, et al., "Temporally and Spatially Resolved Measurements of Neutron Production in a Sheared-low Stabilized (SFS) Z-pinch", 60th Annual Meeting of the APS Division of Plasma Physics, vol. 63, No. 11, Nov. 2018, 1 page.

Shumlak, Uri, et al., "The Zap Flow Z-Pinch Project—Final Technical Report" University of Washington, Seattle, Dec. 31, 2013, 35 pages.

Shumlak, U., "Z Pinch Fusion" Journal of Applied Physics, vol. 127, 200901, May 27, 2020, 11 pages.

Petr, Rodney, "Erosion Phenomena of Arcing Electrodes", A Thesis in Electrical Engineering, May 1980, 106 pages.

The International Searching Authority, "Invitation to Pay Additional Fees" in Application No. PCT/US2023/061196, May 9, 2023, 14 pages.

Jaworski M. A. et al., "Liquid-Metal Plasma-Facing Component Research on the National Spherical Torus Experiment" Plasma Physics and Controled Fusion, vol. 55, No. 12., Nov. 28, 2013, 10 pages.

The International Searching Authority, "Invitation to Pay Additional Fees" in Application No. PCT/US2023/061193, May 9, 2023, 11 pages.

Beste et al., "Understanding the TiH (2-x)/TiOy System at Elevated Temperature: A Literature Review." Jun. 2021, 29 pages.

* cited by examiner

IN SITU RENEWABLE ELECTRODE FOR Z-PINCH PLASMA CONFINEMENT SYSTEM

CROSS-REFERENCE TO RELATED APPLICATIONS

The present application claims priority to each of U.S. Provisional Application No. 63/303,473, entitled "ELECTRODE AND DECOMPOSABLE ELECTRODE MATERIAL FOR Z-PINCH PLASMA CONFINEMENT SYSTEM" and filed on Jan. 26, 2022, and U.S. Provisional Application No. 63/303,477, entitled "IN SITU RENEWABLE ELECTRODE FOR Z-PINCH PLASMA CONFINEMENT SYSTEM" and filed on Jan. 26, 2022. The entire contents of each of the above-identified applications are hereby incorporated by reference for all purposes.

STATEMENT REGARDING FEDERALLY SPONSORED RESEARCH OR DEVELOPMENT

This invention was made, at least in part, with government support under Grant Nos. DE-AR001010 and DE-AR001260, awarded by the United States Department of Energy. The government has certain rights in the invention.

FIELD

Embodiments of the subject matter disclosed herein relate to methods and systems for plasma confinement to induce thermonuclear fusion reactions, and more particularly to electrode compositions and configurations for a Z-pinch plasma confinement system.

BACKGROUND

Economical, efficient, and self-sustainable fusion power has proven elusive. Even with continuing advances, an amount of electrical power input into a fusion reactor almost invariably outweighs electrical power output by the fusion reactor, especially in a production-scale design. A number of factors affect generation of self-sustaining, capturable fusion power or "fusion ignition." For example, fusion reactor configurations may be discussed in terms of the quality of plasma confinement within the fusion reactor, which may be quantified by the triple product of plasma density, plasma confinement time, and plasma temperature. Maximizing one or more factors of the triple product to obtain net fusion power output is particularly difficult.

One example reaction which may be utilized is fusion of deuterium and tritium nuclei, which may be given as:

$$^{2}H+^{3}H\rightarrow^{4}He+n \quad (1)$$

One complicating aspect introduced by the deuterium-tritium fusion reaction is the introduction of the free neutron byproduct n. In combination with electrical discharge currents (which bring about highly energetic ion flux during operation of the fusion reactor), free neutrons may erode material from surfaces of electrodes interfacing with a plasma confinement chamber. While reductions in the discharge current or a repetition rate of the discharge current may correspondingly reduce electrode erosion, net electrical power generation may also suffer such that fusion ignition may remain unattainable.

BRIEF DESCRIPTION OF THE DRAWINGS

Various embodiments and techniques will be described with reference to the drawings, in which.

DETAILED DESCRIPTION

Figure 1:
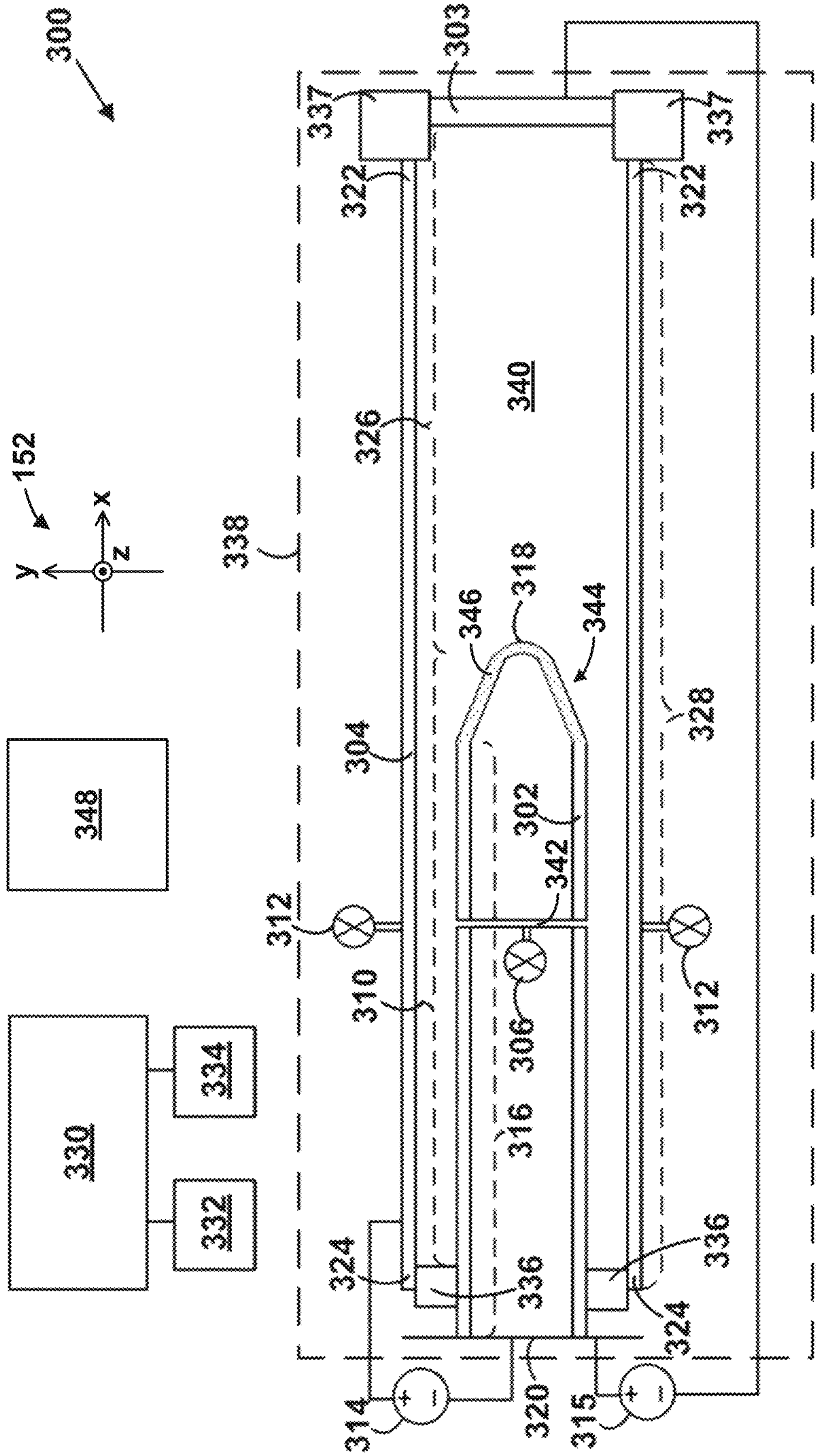
FIG. 1 shows a schematic cross-sectional diagram of a plasma confinement system including a plurality of electrodes, in accordance with at least one embodiment.

Techniques described and suggested herein include a plasma confinement system that includes a plurality of electrodes, each electrode of the plurality of electrodes arranged coaxially with respect to an assembly region of the plasma confinement system and positioned so as to be exposed to the assembly region, wherein one or more electrodes of the plurality of electrodes includes an electrode material which releases hydrogen gas above a threshold temperature.

In some embodiments, a thermonuclear fusion reactor includes a plasma confinement chamber, an inner electrode, and an outer electrode at least partially surrounding the inner electrode, and wherein one or both of the inner electrode or the outer electrode includes a metal hydride to release a fuel gas between the inner electrode and the outer electrode to contribute plasma to a thermonuclear fusion process of the thermonuclear fusion reactor. For example, the one or both of the inner electrode or the outer electrode may include a section composed of the metal hydride.

In some examples, a method includes generating a thermonuclear fusion reaction in a thermonuclear fusion reactor by at least heating an electrode formed from a bulk material and a metal layer evaporated thereon, the metal layer loaded with deuterium and/or tritium, to cause the electrode to release hydrogen gas, forming, using the hydrogen gas, plasma inside the thermonuclear fusion reactor, and using electrical current directed into the plasma, via the electrode, to compress the plasma to produce the thermonuclear fusion reaction. For example, the metal layer may be composed of a metal hydride (e.g., a metal deuteride or a metal tritide or a combination thereof). The metal hydride may be formed following evaporation of the metal layer onto the bulk material and loading of the metal layer with the deuterium and/or tritium.

In at least one embodiment, a plasma confinement system includes a plasma confinement chamber, and an electrode body, including a nosecone positioned so as to be exposed to the plasma confinement chamber, an internal reservoir fluidly coupled to a liquid metal source which stores at least a portion of a liquid metal and/or supplies the liquid metal to the internal reservoir during operation of the plasma confinement system, and a plurality of internal liquid flow channels extending to a surface of the nosecone so as to fluidly couple the internal reservoir to the plasma confinement chamber.

A thermonuclear fusion reactor in accordance with various embodiments includes a plasma confinement chamber, an electrode at least partially enclosed within the plasma confinement chamber, the electrode including a nosecone which intersects with an axis of a plasma arc confined within the plasma confinement chamber during operation of the thermonuclear fusion reactor, and a liquid metal meniscus formed on a surface of the nosecone, the liquid metal meniscus directly interacting with the confined plasma arc during operation of the thermonuclear fusion reactor.

A method in accordance with various embodiments includes flowing a liquid metal from an internal reservoir of an electrode to an external surface of the electrode at a liquid metal flow rate, generating a confined plasma arc to ablate the liquid metal from the external surface at a liquid metal ablation rate, and responsive to the liquid metal flow rate deviating from the liquid metal ablation rate by greater than a threshold magnitude, adjusting the liquid metal flow rate by adjusting one or more of a liquid metal level in the internal reservoir, an inert gas pressure in the internal reservoir, or a liquid metal temperature.

These, as well as other aspects, advantages, and alternatives will become apparent to those of ordinary skill in the art by reading the following detailed description, with reference where appropriate to the accompanying drawings. Further, it should be understood that descriptions and figures provided herein are intended to illustrate the invention by way of example only and, as such, that numerous variations are possible.

For example, the following description relates to various embodiments of systems and methods for confining a plasma within a fusion reactor to sufficient temperature and sufficient density for sufficient duration to induce thermonuclear fusion. In some embodiments, output from the thermonuclear fusion may be harnessed for energy generation/storage. However, other use cases are envisioned for the disclosed embodiments or variations thereof, such as propulsion (e.g., for space vehicles, aircraft, watercraft and submersibles, etc.), research, etc. In extreme environments (e.g., reduced gravity environments aboard space vehicles), certain modifications may be made, e.g., to maintain performance. For example, though the liquid metal meniscus may be retained to the surface of the nosecone via surface tension and/or capillary action, additional components may be implemented to prevent ablated metal from interfering with the confined plasma arc. As an example, a mechanical plunger may be included which may induce flow of the liquid metal from the internal reservoir to the surface of the nosecone, as well as in a reverse direction (from the surface of the nosecone to the internal reservoir, in a similar operating principle to a hypodermic syringe). However, in certain embodiments, retaining tighter tolerances for the mechanical plunger may be complicated by higher temperatures and swelling from neutronic flux.

In an example embodiment, plasma confinement may be achieved via a Z-pinch configuration, wherein an electric current (also known as the "Z-pinch discharge current" or "pinch current") is discharged through the plasma to generate a magnetic field which compresses or "pinches" the plasma in along an axis (e.g., along a linear path through an assembly region of a plasma confinement chamber). The electric current is discharged between a pair of electrodes, which may be subject to appreciable rates of ionic, electronic, and/or neutronic bombardment during fusion reactor operation. As a result, one or more electrodes within the plasma confinement chamber may degrade or erode (e.g., lose mass) over lifetime use of the fusion reactor.

At production scale, a repetition rate of electrical discharge within the plasma confinement chamber may be on the order of tens of Hertz. In one example, based on known spark gap erosion rates (which may approximate erosion within Z-pinch configurations), discharge currents sufficient to induce desirable plasma confinement at a repetition rate of 10-11 Hz may result in hundreds of grams of carbon electrode erosion per hour. Such severe electrode erosion may limit a lifetime of a continuously operating fusion reactor to well under a month.

Of particular, non-limiting interest is maintaining stable (e.g., with little or no appreciable degradation) interfaces between the electrodes and a confined plasma arc within the plasma confinement chamber and/or improving overall fusion reactor performance. At least two strategies are envisioned herein, which may be implemented in isolation in some embodiments and in combination in other embodiments: (i) forming a static solid electrode from an electrode material which supports or improves fusion reactor performance (e.g., as compared to carbon); and (ii) forming an in situ renewable electrode to prevent degradation of a bulk interior of the electrode.

As to formation of the static solid electrode, performance improvements from electrode materials selected for degradation resistance alone may be limited to suborders of magnitude. Thus, electrode materials which confer additional benefits or otherwise improve conditions within the plasma confinement chamber for thermonuclear fusion may be desirable. In an example embodiment, an electrode, or at least a portion thereof, may be formed from one or more metallic hydrides. A given metallic hydride may be considered a two-phase system in reversible equilibrium, as governed by the following:

$$\frac{2}{n}M + H_2 \leftrightharpoons \frac{2}{n}MH_n \tag{2}$$

where n is a ratio of hydrogen atoms to metal ions M in the solid phase. When M is exposed to $H_2$, the metal hydride $MH_n$ may be spontaneously formed in an exothermic process. Upon input of heat, $MH_n$ may decompose back to M and $H_2$. As such, $MH_n$ may provide an internal gas source under plasma confinement conditions, which may supplement or entirely substitute valves (so-called "puff valves") introducing additional gaseous fuel into the plasma confinement chamber.

Moreover, since $MH_n$ may be formed with deuterium ($^2H$ or D) and/or tritium ($^3H$ or T) (e.g., via reaction of M with $D_2$ and/or $T_2$), electrodes formed from metal deuterides and/or metal tritides (e.g., $MD_lT_m$, where l+m=n) may directly participate in thermonuclear fusion reactions (e.g., reaction (1)) in the plasma confinement chamber upon ionic bombardment of the electrodes. As such, $MH_n$ may provide an additional source of fusion neutrons (e.g., as a byproduct of deuterium-tritium fusion).

In certain embodiments, $MH_n$ may itself consume free neutrons to provide an internal tritium source. For example, lithium deuteride ($^6LiD$) may be used as a source of tritium ("tritium breeding"):

$$^6Li^2H+n\rightarrow{}^4He+{}^3H+{}^2H \quad (3)$$

In some embodiments, tritium sourced via reaction (3) may provide an internal supplement to an external tritium source (e.g., a tritium breeding blanket, such as a lithium-containing ceramic or a circulating liquid metal wall such as lead-lithium; such configurations may also function as an electrode, for example, replacing the outer electrode 304 of FIG. 1).

As such, one technical effect of using one or more metal hydrides (e.g., metal deuterides and/or metal tritides) as an electrode material is that the electrode itself may interact with the confined plasma arc to supplement or increase thermonuclear fusion within the plasma confinement chamber of the fusion reactor.

In addition or alternative to adjusting a composition or preparation of a static solid bulk or composite body of the electrode, an interface where the electrode and the assembly region are directly coupled (e.g., without any intervening components or volumes) to one another may be continuously renewed so as to form the in situ renewable electrode (as used herein, "interface" or "interface with" may refer to a solid-gas or liquid-gas phase boundary whereat the solid phase or the liquid phase is in direct contact with the gas phase). As an example, the interface may include a continuously fed (e.g., fed without interruption, or with no appreciable delay, during fusion reactor operation) or dynamically fed (e.g., responsively fed so as to maintain a predetermined thickness at the interface) solid at a surface of the electrode. As another example, the interface may include a continuously fed or dynamically fed liquid meniscus at the surface of the electrode. As another example, a gas may be continuously or dynamically regenerated between the surface of the electrode and the assembly region.

In an example embodiment, a liquid metal film may be maintained on a nosecone of the electrode at a predetermined thickness responsive to adjustments to a repetition rate of the discharge current and/or a rate of electrical power generation. More specifically, the predetermined thickness may be dynamically maintained via adjustments to a flow rate of the liquid metal from an internal reservoir within the electrode body to a surface of the nosecone. As an example, the flow rate may be maintained less than an upper threshold flow rate above which excess liquid metal may form into droplets and separate from the surface of the nosecone, which may adversely affect the confined plasma arc. As an additional or alternative example, the flow rate may be maintained greater than a lower threshold flow rate below which insufficient liquid metal may be present on the surface of the nosecone and appreciable electrode erosion may result. In an example embodiment, each of the upper and lower threshold flow rates may be dependent on the repetition rate of the discharge current and/or the rate of electrical power generation such that the flow rate of the liquid metal, being maintained between the upper and lower threshold flow rates, may match a rate of liquid metal ablation from the surface of the nosecone.

As such, one technical effect of supplying and dynamically replenishing the liquid metal on the nosecone is that the liquid metal may erode and be replaced during fusion reactor operation, such that erosion of the body of the electrode may be mitigated or altogether obviated and a fusion reactor including the electrode may continuously operate for a year or more without replacement of the electrode.

Although example embodiments described in detail below with reference to FIGS. 1-9B may include isolated discussions of the static, solid electrode including the metal hydride or the in situ renewable electrode including the liquid metal film, in other embodiments, an electrode (e.g., an inner electrode, an outer electrode, or an intermediate electrode) including a static, solid electrode body including a metal hydride may be formed with a liquid metal film dynamically replenished on a nosecone of the electrode body. In alternative embodiments, a first electrode (e.g., an outer electrode or an intermediate electrode) of the fusion reactor may be a static, solid electrode including the metal hydride and another, second electrode (e.g., an inner electrode) of the fusion reactor may be an in situ renewable electrode including a nosecone or other surface and a liquid metal film dynamically replenished on the nosecone or other surface. In such embodiments, the second electrode may intersect with the confined plasma arc, the liquid metal film being provided on the nosecone or other surface of the second electrode to mitigate or altogether obviate erosion of a body of the second electrode.

Moreover, in additional, alternative, or otherwise modified embodiments to those described in detail below with reference to FIGS. 1-9B, one or more components of the plasma confinement system may be added, removed, substituted, modified, or interchanged to adapt the plasma confinement system for a given use case. As an example, a plasma may be directly injected into a plasma confinement chamber of the plasma confinement system, e.g., in addition to or instead of intrachamber conversion of a fuel gas to the plasma. Further, though various embodiments described herein are discussed with reference to Z-pinch plasma confinement, the various embodiments, with or without modification, may be applicable to other types of thermonuclear fusion reactors and plasma confinement systems which compress, react, or otherwise use plasma.

Figure 2:
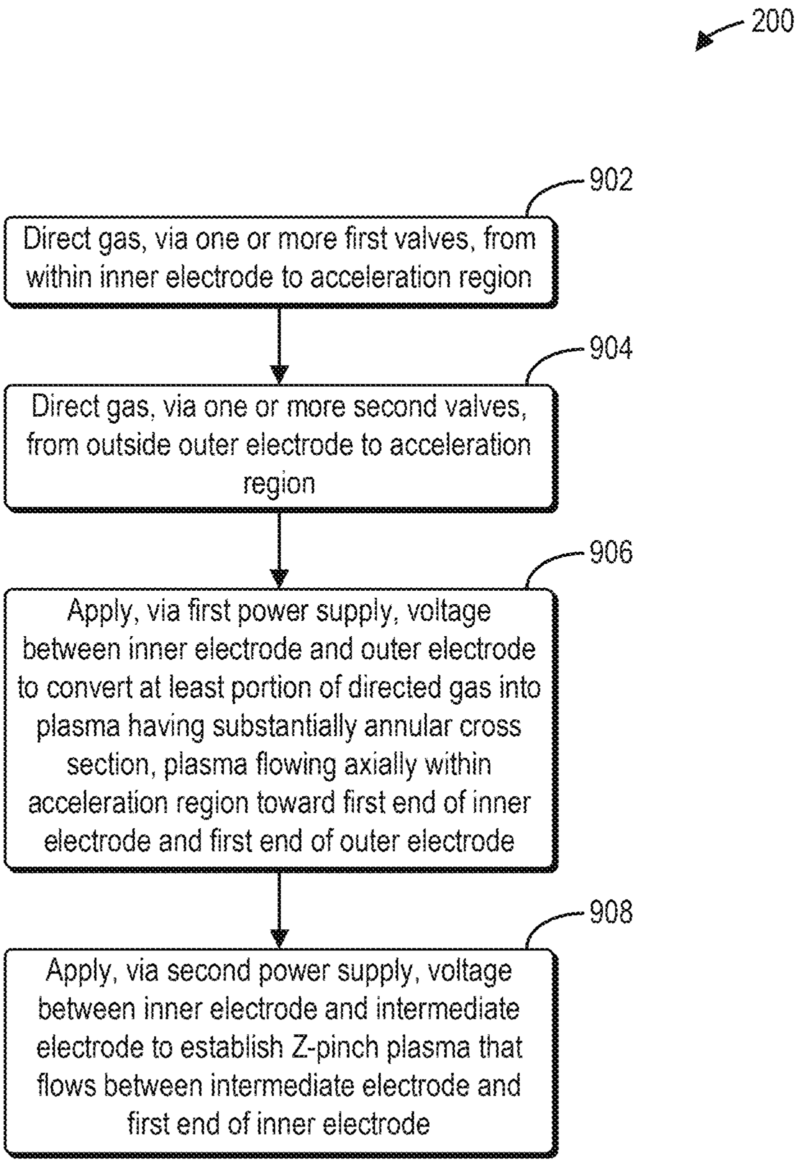
FIG. 2 shows a block diagram of a method for operating a plasma confinement system, for example, by initiating and driving a sheared ion velocity flow therein for stabilization of a Z-pinch discharge, in accordance with at least one embodiment.

Referring now to FIG. 1, a schematic cross-sectional diagram of a plasma confinement system 300, such as may be included within a thermonuclear fusion reactor, is shown. The plasma confinement system 300 may generate a plasma arc within an assembly region 326 of a plasma confinement chamber 340, the plasma arc confined, compressed, and sustained by an axially symmetric magnetic field. The axially symmetric magnetic field may be stabilized by a sheared ion velocity flow driven by electrical discharge between a pair of electrodes interfacing with the plasma confinement chamber 340. FIGS. 2-3F discuss further operational details of the plasma confinement system 300. One or more aspects of the plasma confinement system 300 may be readily transferable to other plasma confinement configurations, such as plasma confinement system 900 described in detail below with reference to FIG. 4.

In one embodiment, at least one of the pair of electrodes is a static, solid electrode including an electrode material

346 which supplements or increases thermonuclear fusion within the plasma confinement chamber 340 during generation of the plasma arc. For instance, the electrode material 346 may release hydrogen gas above a threshold temperature, e.g., to supply fuel gas for the plasma arc. As an example composition, the electrode material 346 may be a metal hydride, such as a metal deuteride and/or a metal tritide including one or more of titanium (Ti), zirconium (Zr), scandium (Sc), magnesium (Mg), vanadium (V), lithium-6 ($^{6}Li$), or alloys formed by any combination of one or more of the preceding metals. A method for forming such a metal hydride containing electrode and operating a plasma confinement system therewith is discussed in detail below with reference to FIG. 5. Ion implantation curves and isotherms for an example metal hydride are provided in FIGS. 6 and 7, respectively.

In an additional or alternative embodiment, at least one of the pair of electrodes may be an in situ renewable electrode including a protective film of a flowing, liquid metal which may ablate from an external surface of the electrode upon interaction with the plasma arc and thereby mitigate high-discharge erosion of the external surface. Additional features of such an in situ renewable electrode are discussed in detail below with reference to FIGS. 8A and 8B, and a method of operating a plasma confinement system including the in situ renewable electrode is discussed in detail below with reference to FIGS. 9A and 9B.

A set of Cartesian coordinate axes 152 is shown in FIG. 1 for contextualizing positions of the various components of the plasma confinement system 300 and for comparing between the various views of FIGS. 1 and 3A-3F. Specifically, x-, y-, and z-axes are provided which are mutually perpendicular to one another, where the x- and y-axes define a plane of the schematic cross-sectional diagram shown in FIG. 1 and the z-axis is perpendicular thereto. In some embodiments, a direction of gravity may be parallel to and coincident with any direction in the plane of the schematic cross-sectional diagram of FIG. 1. For example, the direction of gravity may be parallel and coincident with a positive direction of the x-axis. In additional or alternative embodiments, the direction of gravity may be within a plane defined by the y- and z-axes (e.g., parallel and coincident with a negative direction of the y-axis).

In an example embodiment, the plasma confinement system 300 may include an inner electrode 302 and an outer electrode 304 that substantially surrounds the inner electrode 302 (when the term "substantially" is used herein, it is meant that the recited characteristic, parameter, or value need not be achieved exactly, but that deviations or variations, including, for example, tolerances, measurement error, measurement accuracy limitations, and other factors known to those of skill in the art, may occur in amounts that do not preclude the effect the characteristic was intended to provide). For example, the inner electrode 302 may be at least partially circumferentially surrounded by the outer electrode 304, such that one end of the inner electrode 302 (e.g., a first end 318) may be partially or fully surrounded by the outer electrode 304. In some embodiments, the inner electrode 302 may have a length (e.g., parallel with the y-axis and between the first end 318 and an opposing second end 320) ranging from 25 cm to 1 m or more and a radius (e.g., parallel with the x-axis) ranging from 2 cm to 1 m, and the outer electrode 304 may have a length (e.g., parallel with the y-axis and between a first end 322 and an opposing second end 324) ranging from 50 cm to 6 m, a radius (e.g., parallel with the x-axis) ranging from 6 cm to 2 m or more, and an annular thickness (e.g., along the x-axis) ranging from 6 mm to 12 mm.

In certain embodiments, and as shown in FIG. 1, the plasma confinement system 300 may further include an intermediate electrode 303 that faces the inner electrode 302. In other embodiments, and as described in detail below with reference to FIG. 4, the intermediate electrode 303 may substantially surround the inner electrode 302 and the outer electrode 304 may substantially surround the intermediate electrode 303. For example, the inner electrode 302 may be at least partially circumferentially surrounded by the intermediate electrode 303 and the intermediate electrode 303 may be at least partially circumferentially surrounded by the outer electrode 304, such that one end of the inner electrode 302 (e.g., the first end 318) may be partially or fully surrounded by the intermediate electrode 303 and one end of the intermediate electrode 303 may be partially or fully surrounded by the outer electrode 304.

In some embodiments, the plasma confinement chamber 340 may be a physical structure inclusive of a volume delimited by one or more electrodes, insulators, and internal components of the plasma confinement system 300. As such, in certain embodiments, the plasma confinement chamber 340 may include the one or more electrodes, insulators, and internal components of the plasma confinement system 300 which delimit the volume of the plasma confinement chamber 340.

In an example embodiment, the outer electrode 304 may define a radial outer boundary of the plasma confinement chamber 340. In one example, the radial outer boundary may be cylindrical and formed as a circular cross section propagated along the x-axis, the circular cross section parallel to a plane formed by the y- and z-axes. The plasma confinement chamber 340 may be partitioned (e.g., without any physical partition) into: an acceleration region 310 between the inner electrode 302 and the outer electrode 304, and the assembly region 326 between the first end 318 of the inner electrode 302 and the intermediate electrode 303. Alternatively, in embodiments where the intermediate electrode 303 at least partially surrounds the inner electrode 302, the acceleration region 310 may be between the inner electrode 302 and the intermediate electrode 303, and the assembly region 326 may be between the first end 318 of the inner electrode 302 and an opposing end of the outer electrode 304. In either case, the plasma confinement system 300 may include a plurality of electrodes (e.g., the inner electrode 302, the intermediate electrode 303, and the outer electrode 304), each electrode of the plurality of electrodes arranged coaxially with respect to the assembly region 326 (e.g., parallel to the x-axis) and positioned so as to be exposed to the assembly region 326 (e.g., each given electrode of the plurality of electrodes may interface with a volume of the assembly region 326 without any intervening components or volumes, such that an electrical current can pass directly from a confined plasma to the given electrode). More specifically, the outer electrode 304 may be positioned to define at least a portion of an outer boundary of the assembly region 326, the inner electrode 302 may be positioned at one end of the assembly region 326 (e.g., coincident with the first end 318 of the inner electrode 302), and the intermediate electrode 303, when included, may be positioned at the same end of the assembly region 326 with respect to the inner electrode 302 or an opposite end of the assembly region 326 with respect to the inner electrode 302. The plasma confinement system 300 may be configured to sustain a Z-pinch plasma (e.g., the plasma arc) within the assembly region 326 as described below. In some embodiments, the acceleration region 310 may have a length (e.g., parallel with the y-axis and between the second end 324 of the outer electrode 304 and the first end 318 of the inner electrode 302) ranging from 25 cm to 1.5 m and an annular thickness ranging from 2 cm to 10 cm, and the assembly region 326 may have a length (e.g., parallel with the y-axis and between the first end 318 of the inner electrode 302 and the first end 322 of the outer electrode 304) ranging from 25 cm to 3 m.

The plasma confinement system 300 may include one or more first valves 306 configured to direct gas from within the inner electrode 302 to the acceleration region 310 and one or more second valves 312 configured to direct gas from outside the outer electrode 304 to the acceleration region 310. The gas may be the fuel gas, which may be utilized to form the plasma arc upon release of the gas into the plasma confinement chamber 340 and application of the discharge current. As used herein, "fuel gas" may refer to any species utilized to form the plasma arc. As such, the fuel gas may include neutral gas species, such as dihydrogen [e.g., hydrogen ($H_2$), deuterium ($D_2$), and/or tritium ($T_2$)], $^3$He, $^6$Li, $^{11}$B, etc., and/or pre-ionized gas species (e.g., such as introduced via "direct plasma injection" or "plasma injection" configurations).

The plasma confinement system 300 may include a first power supply 314 configured to apply a voltage (e.g., ranging from 2 kV to 50 kV in some examples or from 1 kV to 40 kV in other examples) between the inner electrode 302 and the outer electrode 304. In some embodiments, the plasma confinement system 300 may further include a second power supply 315 configured to apply a voltage (e.g., ranging from 2 kV to 50 kV in some examples or from 1 kV to 40 kV in other examples) between the inner electrode 302 and the intermediate electrode 303. In certain embodiments, the plasma confinement system 300 may operate with only one of the first and second power supplies 314, 315. In other embodiments, the plasma confinement system 300 may operate at least with both of the first and second power supplies 314, 315. In some embodiments, one or both of the first and second power supplies 314, 315 may include a switching pulsed direct current (switching pulsed-DC) power supply including an energy source (e.g., a capacitor bank), a switch (e.g., a spark gap, an ignitron, or a semiconductor switch), and a pulse shaping network (including, e.g., inductors, resistors, diodes, and the like). In some embodiments, one or both of the first and second power supplies 314, 315 may be voltage-controlled. In other embodiments, one or both of the first and second power supplies 314, 315 may be current-controlled. In some embodiments, other suitable types of power supplies may be used as one or both of first and second power supplies 314, 315, including DC and alternating current (AC) power supplies (e.g., DC grids, voltage source converters, homopolar generators, and the like).

The inner electrode 302 may include an electrically conducting (e.g., stainless steel) shell having a modified cylindrical body 316 (e.g., a substantially cylindrical body with a tapered, rounded base at the first end 318). Specifically, the inner electrode 302 may include the first end 318 (e.g., a tapered, rounded base) and the opposing second end 320 (e.g., a substantially flat, circular base). For instance, the inner electrode 302 may include a nosecone 344 positioned at the first end 318, the nosecone 344 exposed to the assembly region 326 so as to be intersected by an axis of the confined plasma arc coaxial with each electrode of the plurality of electrodes (e.g., parallel to the x-axis). In an example embodiment, the nosecone 344 may include the electrode material 346 which supplements or increases thermonuclear fusion within the plasma confinement chamber 340 during generation of the plasma arc (e.g., via release of hydrogen gas to fuel the confined plasma arc). However, in other embodiments, the electrode material 346 is not limited to the nosecone 344 and may additionally be included on another portion of the inner electrode 302 and/or on any other electrode(s) of the plurality of electrodes (accordingly, in certain embodiments, the electrode material 346 may not be included on the nosecone 344 at all). In any case, the electrode material 346 may only occupy a portion of one or more electrodes of the plurality of electrodes and a remaining portion (e.g., all portions of the plurality of electrodes excepting the portion occupied by the electrode material 346) may be free from the electrode material 346. Accordingly, when the electrode material 346 is included, fuel gas may be expelled into the acceleration region 310 responsive to heating one or more of the inner electrode 302, the intermediate electrode 303, or the outer electrode 304 (e.g., such that the electrode material 346 thermally decomposes to release the fuel gas). The inner electrode 302 may further include one or more conduits or channels 342 for routing gas (e.g., the fuel gas) from the one or more first valves 306 to the acceleration region 310, for example, during operation of the plasma confinement system 300 to generate thermonuclear fusion.

In additional or alternative embodiments, the electrode material 346 may be present as a filament separate from any of the electrodes in the plasma confinement system 300. In such embodiments, the electrode material 346 may, upon heating and thermal decomposition thereof, provide at least a portion of the fuel gas to the plasma confinement chamber 340.

The outer electrode 304 may include an electrically conducting (e.g., stainless steel) shell having a substantially cylindrical body 328. Specifically, the outer electrode 304 may include the first end 322 (e.g., a substantially flat, circular base) and the opposing second end 324 (e.g., a substantially flat, circular base). The outer electrode 304 may surround much (e.g., a majority) of the inner electrode 302. In an example embodiment, the inner electrode 302 and the outer electrode 304 may be concentric and have radial symmetry with respect to the x-axis. The first end 318 of the inner electrode 302 may be between the first end 322 of the outer electrode 304 and the second end 324 of the outer electrode 304. The outer electrode 304 may further include one or more conduits or channels (not shown at FIG. 1) for routing gas (e.g., the fuel gas) from the one or more second valves 312 to the acceleration region 310, for example, during operation of the plasma confinement system 300 to generate thermonuclear fusion.

The intermediate electrode 303 may include an electrically conducting material (e.g., stainless steel). In some embodiments, the intermediate electrode 303 may be substantially disc-shaped. In other embodiments, the intermediate electrode may have a substantially cylindrical body concentric with each of the inner electrode 302 and the outer electrode 304 and having radial symmetry with respect to the x-axis.

The one or more first valves 306 may take the form of so-called "puff valves" (e.g., operable to provide fuel gas for formation of a plasma or increase a density of the as-generated plasma arc via gas puffing) or plasma injectors. In additional or alternative embodiments, the one or more first valves 306 may include at least one electrically actuated valve, such as a solenoid-driven valve. However, the one or more first valves 306 are not limited to such configurations and may include any type of valve configured to direct gas (e.g., $H_2$, $D_2$, $T_2$) from within the inner electrode 302 to the acceleration region 310.

In some embodiments, the one or more first valves 306 may include at least one gas-puff valve (e.g., to provide neutral gas to the acceleration region 310) and/or at least one plasma injector (e.g., to provide pre-ionized gas to the acceleration region 310) installed as a regular array or arrays along the inner electrode 302 (e.g., regularly distributed around a central axis of the acceleration region 310). As shown in FIG. 1, the one or more first valves 306 may be positioned (e.g., positioned axially) between the first end 318 of the inner electrode 302 and the second end 320 of the inner electrode 302. Alternatively, the one or more first valves 306 may be located at (e.g., directly adjacent to) the first end 318 of the inner electrode 302 or the second end 320 of the inner electrode 302. In FIG. 1, each of the one or more first valves 306 is arranged within (e.g., positioned inside and on an inner surface of) the inner electrode 302, but other examples are possible (e.g., positioned outside and on an outer surface of the inner electrode 302). The one or more first valves 306 may be electrically actuatable in that the one or more first valves 306 may be operated by providing the one or more first valves 306 with a control voltage, as described below. In certain embodiments wherein the electrode material 346 is included, no first valves 306 may be included (e.g., the electrode material 346 may supply at least some of the gas upon decomposition thereof).

In an example embodiment, the acceleration region 310 may have a substantially annular cross section defined by the shapes of the inner electrode 302 and the outer electrode 304. Specifically, the inner electrode 302 may define a radial inner boundary of the acceleration region 310 and the outer electrode 304 may define a radial outer boundary of the acceleration region 310. In one example, each of the radial inner boundary and the radial outer boundary may be cylindrical and formed as a circular cross section propagated along the x-axis, the circular cross section parallel to the plane formed by the y- and z-axes. In other embodiments, the substantially annular cross section of the acceleration region 310 may be defined by the shapes of the inner electrode 302 and the intermediate electrode 303 (e.g., the inner electrode 302 may defined the radial inner boundary and the intermediate electrode 303 may define the radial outer boundary).

In the same manner as the one or more first valves 306, the one or more second valves 312 may take the form of "puff valves" or plasma injectors. In additional or alternative embodiments, the one or more second valves 312 may include at least one electrically actuated valve, such as a solenoid-driven valve. However, the one or more second valves 312 are not limited to such configurations and may include any type of valve configured to direct gas (e.g., $H_2$, $D_2$, and/or $T_2$) from outside the outer electrode 304 (or the intermediate electrode 303) to the acceleration region 310.

In some embodiments, the one or more second valves 312 may include at least one gas-puff valve (e.g., to provide neutral gas to the acceleration region 310) and/or at least one plasma injector (e.g., to provide pre-ionized gas to the acceleration region 310) installed as a regular array or arrays along the outer electrode 304 (e.g., regularly distributed around the acceleration region 310). As shown in FIG. 1, the one or more second valves 312 may be positioned (e.g., positioned axially) between the first end 322 of the outer electrode 304 and the second end 324 of the outer electrode 304. Alternatively, the one or more second valves 312 may be located at (e.g., directly adjacent to) the first end 322 of the outer electrode 304 or the second end 324 of the outer electrode 304. In FIG. 1, each of the one or more second valves 312 is arranged around (e.g., positioned outside and on an outer surface of) the outer electrode 304, but other examples are possible (e.g., positioned within the plasma confinement chamber 340, such as on an inner surface of the outer electrode 304 or on an inner surface of the intermediate electrode 303). Moreover, in FIG. 1, each of the one or more first valves 306 is axially aligned with each of the one or more second valves 312, but other examples are possible. The one or more second valves 312 may be electrically actuatable in that the one or more second valves 312 may be operated by providing the one or more second valves 312 with a control voltage, as described below. In certain embodiments wherein the electrode material 346 is included, no second valves 312 may be included (e.g., the electrode material 346 may supply at least some of the gas upon decomposition thereof).

In some embodiments, gas-puff valves and/or plasma injectors included in the one or more first valves 306 and/or the one or more second valves 312 may be electronically triggered to independently deliver a "puff" of filling neutral and/or pre-ionized gas for a duration lasting up to several hundred μs (e.g., up to 1 ms). An amount of filling gas (also referred to herein as "fuel gas") delivered (e.g., in the "puff") may also be controlled by adjustments of a filling gas pressure supplied to the gas-puff valves and/or plasma injectors (e.g., to individual or all of the gas-puff valves and/or plasma injectors or subsets thereof). In addition, different gas-puff valves and/or plasma injectors (or different combinations of multiple gas-puff valves and/or plasma injectors) may be fed by different fill gas mixtures having, for example, different elemental ratios of filling gases and/or different isotopic ratios (e.g., adjustable $D_2/T_2$ molecular ratios). In some embodiments, the gas-puff valves and/or plasma injectors may be uniform (e.g., all of the same type/size with substantially the same operational settings). In other embodiments, different gas-puff valves and/or plasma injectors may be used for different locations. In additional or alternative embodiments, the gas-puff valves and/or plasma injectors may control a flow of gas into the acceleration region 310 via a manifold including multiple ports providing passage into the acceleration region 310. In such embodiments, the ports of the manifold may be uniform or may vary in configuration (e.g., to deliver different amounts of gas to different locations of the acceleration region 310 when a respective gas-puff valve or plasma injector is open).

Similar to neutral gas injection via gas-puff valves, (pre-) ionized gas or plasma may be injected using combinations or manifolds of variously located plasma injectors fluidically coupled to respective plasma generators or guns which generate the plasma prior to injection into the acceleration region 310. In some embodiments, the plasma may be sourced from a gas-injected washer plasma gun and/or a plasma thruster (e.g., a Hall effect thruster or a magnetohydrodynamic thruster), or, if the plasma is magnetized, from a high-power helicon plasma source, a radio frequency plasma source, a plasma torch, and/or a laser-based plasma source. Plasmas formed from gas mixtures may also be created and injected in a manner similar to neutral gas injection. Plasma injection may provide a finer control of an eventual axial plasma distribution as well as a shear flow profile thereof, which in turn may allow for higher fidelity control of plasma stability and lifetime. Additional control of plasma injection may be provided due to the plasma particles being charged particles that may be accelerated by electric fields created by a variable electrical bias (or voltage) on injection electrodes. Thus, a speed of the injected plasma may be finely controlled to allow for fine adjustment and optimization of breakdown of any neutral gas present (e.g., in the acceleration region 310). Moreover, the injected plasma may travel at faster velocities than injected neutral gas, which may travel in a nearly static fashion (relative to the injected plasma) during Z-pinch discharge pulses. As such, relative to neutral gas injection, plasma injection may provide pre-ionized fuel "on demand" (e.g., more immediately), for example, to replenish the fuel gas during Z-pinch discharge pulses.

In some embodiments, the pre-ionized gas may be generated as an unmagnetized plasma, e.g., so as to avoid interaction between a magnetic field of the pre-ionized gas and a magnetic field of the acceleration region 310. In other embodiments, the pre-ionized gas may be generated as a magnetized plasma, e.g., so as to align the magnetic field of the pre-ionized gas to be parallel with the magnetic field of the acceleration region 310 and/or be adjustable to provide a desired magnetic flux profile at an injection point of the pre-ionized gas.

In some embodiments, plasma to be injected into the acceleration region 310 may be generated by pre-ionizing neutral gas with a spark plug or via inductive ionization. More broadly, the gas-puff valves and/or plasma injectors may include one or more electrode plasma injectors and/or one or more electrodeless plasma injectors. In examples wherein the one or more electrode plasma injectors are included, the plasma to be injected into the acceleration region 310 may be generated, at least in part, by electrode discharge. In additional or alternative examples wherein the one or more electrodeless plasma injectors are included, the plasma to be injected into the acceleration region 310 may be generated, at least in part, by inductive discharge produced by an external coil window (e.g., a radio-frequency antenna operating at 400 kHz, 13.56 MHz, 2.45 GHz, and/or other frequencies permitted for use in a given local jurisdiction, such as within frequency ranges permitted by the Federal Communications Commission). In some embodiments, neutral gas for pre-ionization may be limited by a configuration of a neutral gas reservoir (e.g., a gas source 330) and/or neutral gas conductance to a selected plasma injector configuration.

In some embodiments, axial distribution of the injected plasma may be ensured via an axisymmetric plasma injector configuration. In at least one embodiment, eight plasma injectors may be respectively positioned at eight equally spaced ports of the manifold. The eight ports may each be configured at an oblique angle (e.g., between 5° and 90° with respect to the central axis of the acceleration region 310) with respect to a housing of the acceleration region 310 (e.g., the surrounding outer electrode 304). In one example, the oblique angle may be 45° with respect to the central axis of the acceleration region 310. In some embodiments, the eight ports may be configured at a single axial position along the central axis of the acceleration region 310 (that is, the eight ports may be equally spaced about a circumference or other perimeter of the acceleration region 310 at the axial position). In other embodiments, the ports may include multiple sets of eight ports, with each set of eight ports being equally spaced about a different axial position along the central axis of the acceleration region 310. In an example embodiment, the sets of eight ports may be configured as interleaved pairs of sets, wherein a first set of eight ports may be positioned at a first axial location and a second set of eight ports may be positioned at a second, different axial location and rotated relative to the first set such that each port of the second set is positioned between a pair of ports of the first set with respect to the circumference of the acceleration region 310. Specifically, in such an embodiment, each port of the first set of eight ports may be spaced around the circumference of the acceleration region 310 every 45°, and each port of the second set of eight ports may be spaced around the circumference of the acceleration region 310 every 45° offset (rotated) from the first set of ports by 22.5°, such that one port of the first and second sets is provided around the circumference of the acceleration region 310 every 22.5°. In additional or alternative embodiments, plasma injection may be performed azimuthally, e.g., along a chord perpendicular to the central axis of the acceleration region 310, so as to generate an azimuthal flow within the acceleration region 310. In some embodiments, additional gas-puff valves and/or plasma injectors may be included to allow for injection of more fuel gas (e.g., for longer lasting pinch discharges) and control of an axial pressure distribution of the fuel gas in the acceleration region 310 (e.g., for additional enhancement of the sheared ion velocity flow duration). In additional or alternative embodiments, the valves may be configured differently (e.g., asymmetrically distributed azimuthally and/or with different angular distributions) with other variations to achieve a substantially equivalent profile by compensating for effects of the variations.

In some embodiments, injecting the acceleration region 310 with pre-ionized gas may result in plasmas having a plasma temperature in a range of 1 to 10 eV. The plasma temperature may be decreased (e.g., by reducing an amount of energy input into a process gas used to generate the pre-ionized gas) so as to increase an electrical resistivity of the pre-ionized gas and resulting plasma. Specifically, increasing the electrical resistivity may decrease a tendency of the pre-ionized gas to oppose changes in magnetic flux and thereby a tendency to oppose motion within a magnetic field present in the acceleration region 310.

As noted above, because an injection velocity of pre-ionized gas may be significantly greater than that of neutral gas, a velocity of the plasma within the acceleration region 310 may be up to $50\times10^3$ m/s. In some embodiments, injection of pre-ionized gas may provide flexibility in an amount of particles injected. Specifically, in an example embodiment, an amount of pre-ionized gas particles may be injected in 1/50 of a time utilized to inject the same amount of neutral gas particles. For example, an amount of time utilized to inject 10 Torr-L of neutral gas particles (where 1 Torr-L is proportional to $2.5\times10^{19}$ molecules at 273 K) may be the same amount of time utilized to inject 500 Torr-L of pre-ionized gas particles. Similarly, in some embodiments, an injection rate (or mass flow rate) of pre-ionized gas may be varied according to power supply current and voltage (that is, a waveform of an injection pulse). As an example, increasing the power supply voltage (e.g., to between 100 V and 500 V) may concomitantly increase the injection velocity. As another example, increasing the power supply current (e.g., to between 1 A and 500 A) may concomitantly increase the injection rate. In some embodiments, the power supply voltage may be increased to between 750 V and 5 kV.

As discussed above, the gas-puff valves and/or plasma injectors may be activated either individually or in groups. An initial gas load inside the acceleration region 310 having desired axial and azimuthal profiles may be achieved by timing individual valves and/or groups of valves. Such valves (or groups thereof) may be timed in a fashion to align an arrival of the neutral and/or pre-ionized gas and/or mixtures thereof to a desired initial profile. Power supplies (e.g., power supplies 314 and 315 or separate, dedicated power supplies) may be timed to achieve ionization at a desired axial location and utilize the initial gas load to produce and sustain the sheared flow. In some embodiments, the power supplies may include a capacitor bank and a switch. In other embodiments, other suitable types of power supplies may be used, including flywheel power supplies.

Various combinations of (neutral gas) gas-puff valves with plasma injectors may be activated to achieve a desired level of power output. Moreover, plasma may be injected into the acceleration region 310 significantly (e.g., ~100×) faster than puffed neutral gas. A combination of such different injection speeds allowed by acceleration of plasma injection with neutral gas injection provides an even larger parameter space for optimization. Additionally, plasma injectors may serve to inject mass and precisely control locations of neutral gas ionization.

In an example embodiment, the first power supply 314 and the second power supply 315 may take the form of respective capacitor banks each capable of storing up to 10 MJ (e.g., 0.1 to 10 MJ). In one embodiment, the first power supply 314 and the second power supply 315 take the form of respective capacitor banks capable of storing up to 100-200 kJ and 3-4 MJ, respectively.

The plasma confinement system 300 may include the gas source 330 (e.g., a pressurized storage tank) and one or more first regulators 332 respectively configured to control gas flow from the gas source 330 through the one or more first valves 306. Respective couplings (e.g., piping) between the one or more first regulators 332 and the one or more first valves 306 are omitted in FIG. 1 for clarity.

Similarly, the plasma confinement system 300 may include one or more second regulators 334 respectively configured to control gas flow from the gas source 330 through the one or more second valves 312. Respective couplings (e.g., piping) between the one or more second regulators 334 and the one or more second valves 312 are omitted in FIG. 1 for clarity.

In some embodiments, the plasma confinement system 300 may include a first insulator 336 (e.g., having an annular cross section) between the inner electrode 302 and the outer electrode 304 to maintain electrical isolation between the inner electrode 302 and the outer electrode 304. In other embodiments, such as when the inner electrode 302 is at least partially surrounded by the intermediate electrode 303, the first insulator 336 may be positioned between the inner electrode 302 and the intermediate electrode 303 to maintain electrical isolation between the inner electrode 302 and the intermediate electrode 303. In an example embodiment, the first insulator 336 may be formed from an electrically insulating material such as a glass, a ceramic, or a glass-ceramic material. In some embodiments, one or more valves (e.g., gas-puff valves and/or plasma injectors) may extend through or be provided in place of the first insulator 336 to inject neutral gas and/or pre-ionized gas at an end of the acceleration region 310 opposite to the first end 318 of the inner electrode 302.

Similarly, the plasma confinement system 300 may include a second insulator 337 (e.g., having an annular cross section) between the intermediate electrode 303 and the outer electrode 304 to maintain electrical isolation between the intermediate electrode 303 and the outer electrode 304. In an example embodiment, the second insulator 337 may be formed from an electrically insulating material such as a glass, a ceramic, or a glass-ceramic material.

The plasma confinement system 300 may include a vacuum chamber 338 that at least partially surrounds the inner electrode 302, the intermediate electrode 303, and/or the outer electrode 304. In the example embodiment depicted in FIG. 1, the vacuum chamber 338 entirely surrounds each of the inner electrode 302, the intermediate electrode 303, and the outer electrode 304 (and thereby the plasma confinement chamber 340). In an example embodiment, the vacuum chamber 338 may be formed as a stainless steel pressure vessel. In some embodiments, a pressure inside the vacuum chamber 338 may range from $10^{-9}$ Torr to 20 Torr (e.g., $10^{-9}$ Torr to $10^{-3}$ Torr).

The plasma confinement system 300 may include a controller or other computing device 348, which may include non-transitory memory on which executable instructions may be stored. The executable instructions may be executed by one or more processors of the controller 348 to perform various functionalities of the plasma confinement system 300. Accordingly, the executable instructions may include various routines for operation, maintenance, and testing of the plasma confinement system 300. The controller 348 may further include a user interface at which an operator of the plasma confinement system 300 may enter commands or otherwise modify operation of the plasma confinement system 300. The user interface may include various components for facilitating operator use of the plasma confinement system 300 and for receiving operator inputs (e.g., requests to generate plasma arcs for thermonuclear fusion, etc.), such as one or more displays, input devices (e.g., keyboards, touchscreens, computer mice, depressible buttons, mechanical switches other mechanical actuators, etc.), lights, etc. The controller 348 may be communicably coupled to various components (e.g., valves, power supplies, etc.) of the plasma confinement system 300 to command actuation and use thereof (wired and/or wireless communication paths between the controller 348 and the various components are omitted from FIG. 1 for clarity).

Referring now to FIGS. 2-3F, operational aspects of a plasma confinement system, such as the plasma confinement system 300 described in detail above with reference to FIG. 1, are illustrated. Specifically, in FIG. 2, a block diagram of a method 200 for operating the plasma confinement system is shown, and, in FIGS. 3A-3F, schematic cross-sectional diagrams of a portion 350 of the plasma confinement system 300 of FIG. 1 and functionality thereof are respectively shown. Accordingly, FIGS. 1 and 3A-3F, viewed together, illustrate at least some of the aspects of the method 200 as described below. In an example embodiment, operation of the plasma confinement system (e.g., the plasma confinement system 300) may include initiating and driving a sheared ion velocity flow therein for stabilization of Z-pinch discharge.

In some embodiments, the method 200, or a portion thereof, may be implemented as executable instructions stored in non-transitory memory of a computing device, such as a controller communicably coupled to the plasma confinement system. Moreover, in certain embodiments, additional or alternative sequences of steps may be implemented as executable instructions on such a computing device, where individual steps discussed with reference to the method 200 may be added, removed, substituted, modified or interchanged.

At block 902, the method 200 may include directing gas, via one or more first valves, from within an inner electrode to an acceleration region of a plasma confinement chamber. In an example embodiment, the acceleration region may be located between the inner electrode and an outer electrode that substantially surrounds the inner electrode. In other embodiments, the acceleration region may be located between the inner electrode and an intermediate electrode that substantially surrounds the inner electrode, the outer electrode substantially surrounding the intermediate electrode.

Figure 3A:
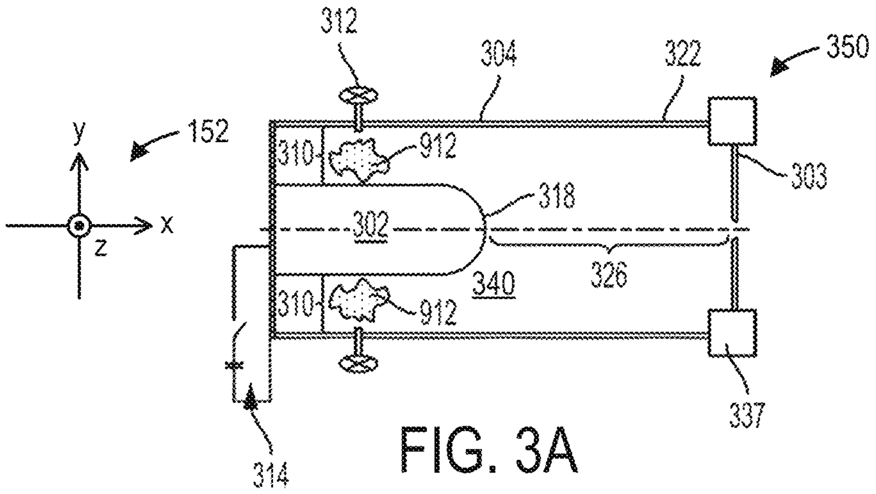
FIGS. 3A-3F show schematic cross-sectional diagrams of a process of initiating and driving a sheared ion velocity flow in the plasma confinement system of FIG. 1 for stabilization of a Z-pinch discharge, in accordance with at least one embodiment.
Figure 3B:
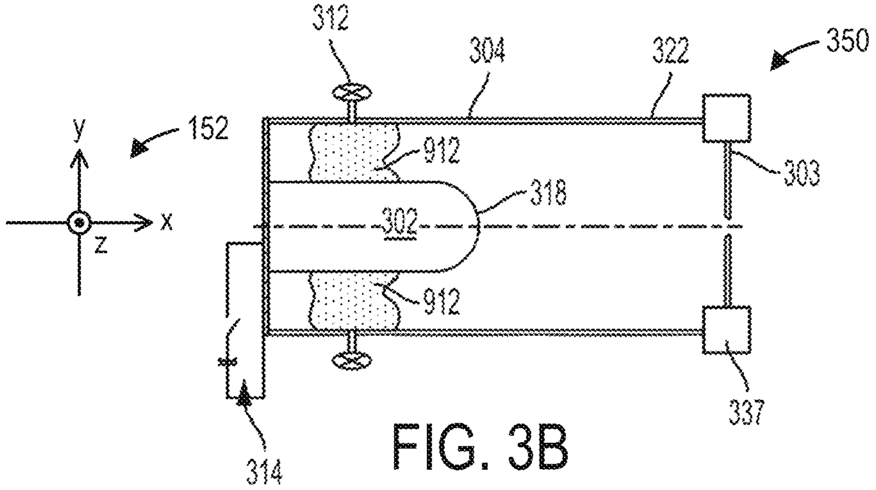

For example, and as shown in FIGS. 3A and 3B, the one or more first valves 306 may direct a gas 912 from within the inner electrode 302 to the acceleration region 310 between the inner electrode 302 and the outer electrode 304 that substantially surrounds the inner electrode 302. Specifically, FIG. 3A illustrates an initial amount of the gas 912 entering the acceleration region 310 and FIG. 3B illustrates an additional amount of the gas 912 entering the acceleration region 310. As shown in FIG. 3A, the acceleration region 310 may be included, along with the assembly region 326, in the plasma confinement chamber 340.

In some embodiments, directing the gas 912 via the one or more first valves 306 may include providing (e.g., via a power supply such as a capacitor bank that is not shown at FIGS. 3A-3F) a first valve voltage to the one or more first valves 306 (e.g., to control terminals of the one or more first valves 306) followed by providing a second valve voltage [e.g., via a DC power supply] to the one or more first valves 306. In an example embodiment, the first valve voltage may be greater than the second valve voltage and the second valve voltage may be provided immediately (e.g., substantially immediately) after providing the first valve voltage.

At block 904, the method 200 may include directing gas, via one or more second valves, from outside the outer electrode to the acceleration region.

For example, and as shown in FIGS. 3A and 3B, the one or more second valves 312 may direct a portion of the gas 912 into the acceleration region 310.

In some embodiments, directing the gas 912 via the one or more second valves 312 may include providing (e.g., via a power supply such as a capacitor bank that is not shown) a third valve voltage to the one or more second valves 312 (e.g., to control terminals of the one or more second valves 312) followed by providing a fourth valve voltage (e.g., via a DC power supply) to the one or more second valves 312. In an example embodiment, the third valve voltage may be greater than the fourth valve voltage and the fourth valve voltage may be provided immediately (e.g., substantially immediately) after providing the third valve voltage.

After operation of the one or more first valves 306 and the one or more second valves 312, a gas pressure at, e.g., directly adjacent to (upon release) or within (such as within a plenum of, when present), each of the one or more first valves 306 and the one or more second valves 312 may be up to 5800 Torr, such as within a range of 1000 to 5800 Torr (e.g., 5450 to 5550 Torr), prior to applying a voltage between the inner electrode 302 and the outer electrode 304 via the first power supply 314. Correspondingly, after operation of the one or more first valves 306 and the one or more second valves 312, a gas pressure within the acceleration region 310 may be up to 5800 Torr, such as within the range of 1000 to 5800 Torr (e.g., 5450 to 5550 Torr), prior to applying the voltage between the inner electrode 302 and the outer electrode 304 via the first power supply 314. In an example embodiment, the gas pressure within the acceleration region 310 may decrease with increasing distance from a point of gas insertion and with passage of time after gas is no longer introduced to the acceleration region 310.

At block 906, the method 200 may include applying, via a first power supply, a voltage between the inner electrode and the outer electrode to convert at least a portion of the directed gas into a plasma having a substantially annular cross section, the plasma flowing axially within the acceleration region toward a first end of the inner electrode and a first end of the outer electrode.

Figure 3C:
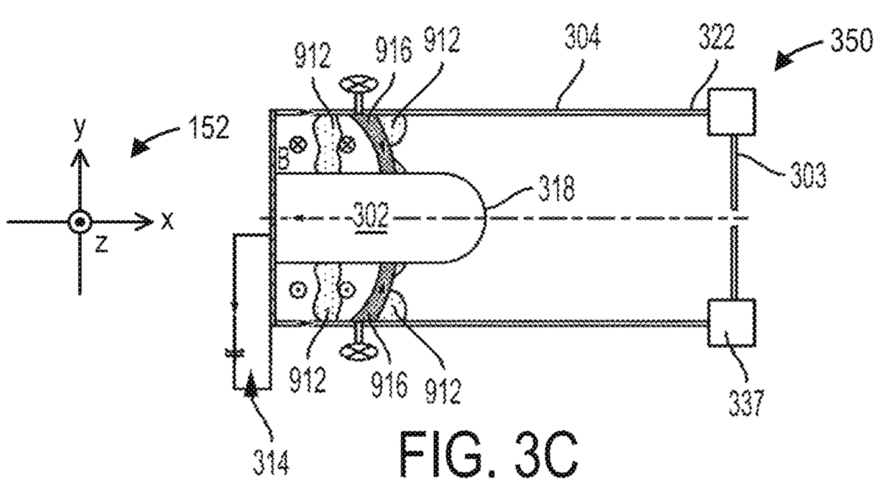
Figure 3D:
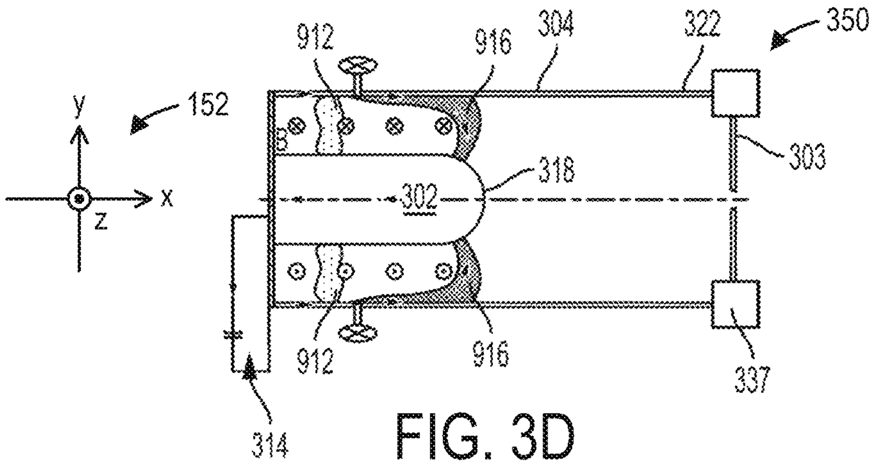

For example, and as shown in FIGS. 3C and 3D, the first power supply 314 may apply the voltage between the inner electrode 302 and the outer electrode 304 to convert at least a portion of the gas 912 into a plasma 916 having a substantially annular cross section. The voltage applied by the first power supply 314 between the inner electrode 302 and the outer electrode 304 may result in a radial electric field within the acceleration region 310 up to 500 kV/m (e.g., within a range of 30 kV/m to 500 kV/m). Due to a magnetic field being generated by a current traveling through the plasma 916, the plasma 916 may flow axially within the acceleration region 310 toward the first end 318 of the inner electrode 302 and the first end 322 of the outer electrode 304 (as shown in FIGS. 3C and 3D).

At block 908, the method 200 may include applying, via a second power supply, a voltage between the inner electrode and the intermediate electrode to establish a plasma arc (e.g., a Z-pinch plasma) that flows between the intermediate electrode and the first end of the inner electrode. In an example embodiment, the intermediate electrode may be positioned at a first end of the outer electrode. In other embodiments, and as discussed above, the intermediate electrode may substantially surround the inner electrode, and the outer electrode may substantially surround the intermediate electrode.

Figure 3E:
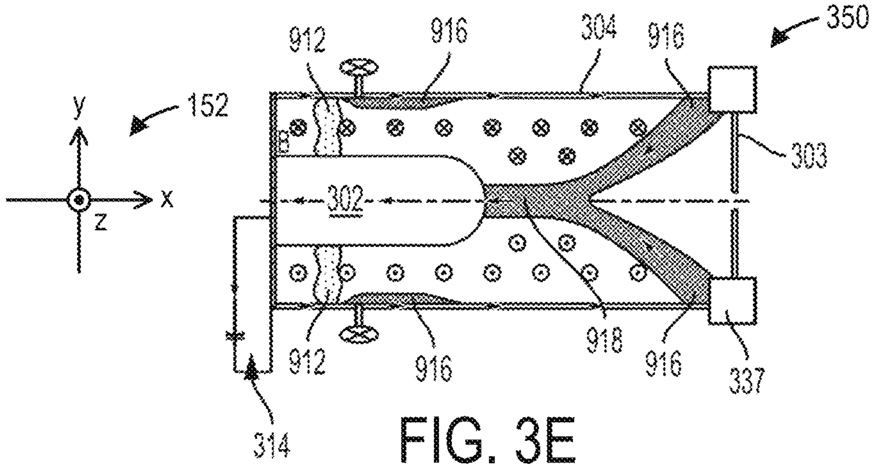
Figure 3F:
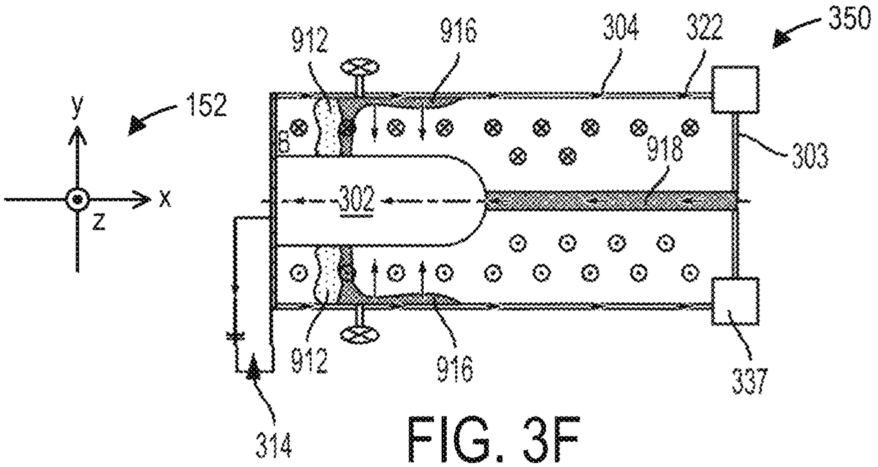

For example, and as shown in FIGS. 3E and 3F, the second power supply (e.g., the second power supply 315 as described in detail above with reference to FIG. 1; omitted in FIGS. 3A-3F for clarity) may apply a voltage between the inner electrode 302 and the intermediate electrode 303 to confine the plasma 916 and establish a plasma arc 918 (also referred to herein as a Z-pinch plasma 918) that flows between the intermediate electrode 303 and the first end 318 of the inner electrode 302. As shown, the plasma arc 918 may be established when the plasma 916 moves beyond the acceleration region 310. Specifically, the plasma arc 918 may flow into the assembly region 326 between the first end 318 of the inner electrode 302 and the intermediate electrode 303. In some embodiments, such as when the inner electrode 302 functions as a cathode and the intermediate electrode 303 functions as an anode, each of a discharge current forming the plasma arc 918 and a sheared axial (ion velocity) flow stabilizing the discharge current may flow from the first end 318 of the inner electrode 302 to the intermediate electrode 303. In other embodiments, such as when the inner electrode 302 functions as the anode and the intermediate electrode 303 functions as the cathode, the discharge current may flow from the intermediate electrode 303 to the first end 318 of the inner electrode 302 and the sheared axial flow may flow from the first end 318 of the inner electrode 302 to the intermediate electrode 303. In some embodiments, to augment the sheared flow profile created by neutral gas injection, injection of pre-ionized gas using plasma injectors, plasma guns, or ion sources may be employed in conjunction. In such embodiments, accordingly, plasma injection may occur rapidly and on the same scale as blocks 902 and 904, and may be used to control formation/initialization and dynamics of the plasma arc 918.

In an example embodiment, the plasma arc 918 may exhibit the sheared axial flow and have a radius up to 5 mm (e.g., between 0.05 and 5 mm), an ion temperature up to 100000 eV, such as between 900 and 30000 eV (e.g., 900 to 2000 eV), an electron temperature greater than 500 eV, an ion number density greater than $1\times10^{23}$ ions/m$^3$ and/or an electron number density greater than $1\times10^{23}$ electrons/m$^3$, and/or a magnetic field over 8 T, and/or may be stable for at least 1 μs, such as between 5 and 10 us or up to 1 ms. It should be noted that such ranges are exemplary and may be modified based on an operating mode of the plasma confinement system 300 or based on modifications to a size, function, configuration, etc. of the plasma confinement system 300. For example, if the size of the plasma confinement system 300 increases, such ranges may scale proportionally (e.g., linearly, exponentially, etc.).

It should be noted that blocks 906 and 908 may be implemented by other means of controlling (a) the voltage between the inner electrode 302 and the outer electrode 304 and (b) the voltage between the inner electrode 302 and the intermediate electrode 303, as one of skill in the art will recognize. For example, a power supply may provide a voltage between the intermediate electrode 303 and the outer electrode 304, instead of between the inner electrode 302 and the intermediate electrode 303.

Figure 4:
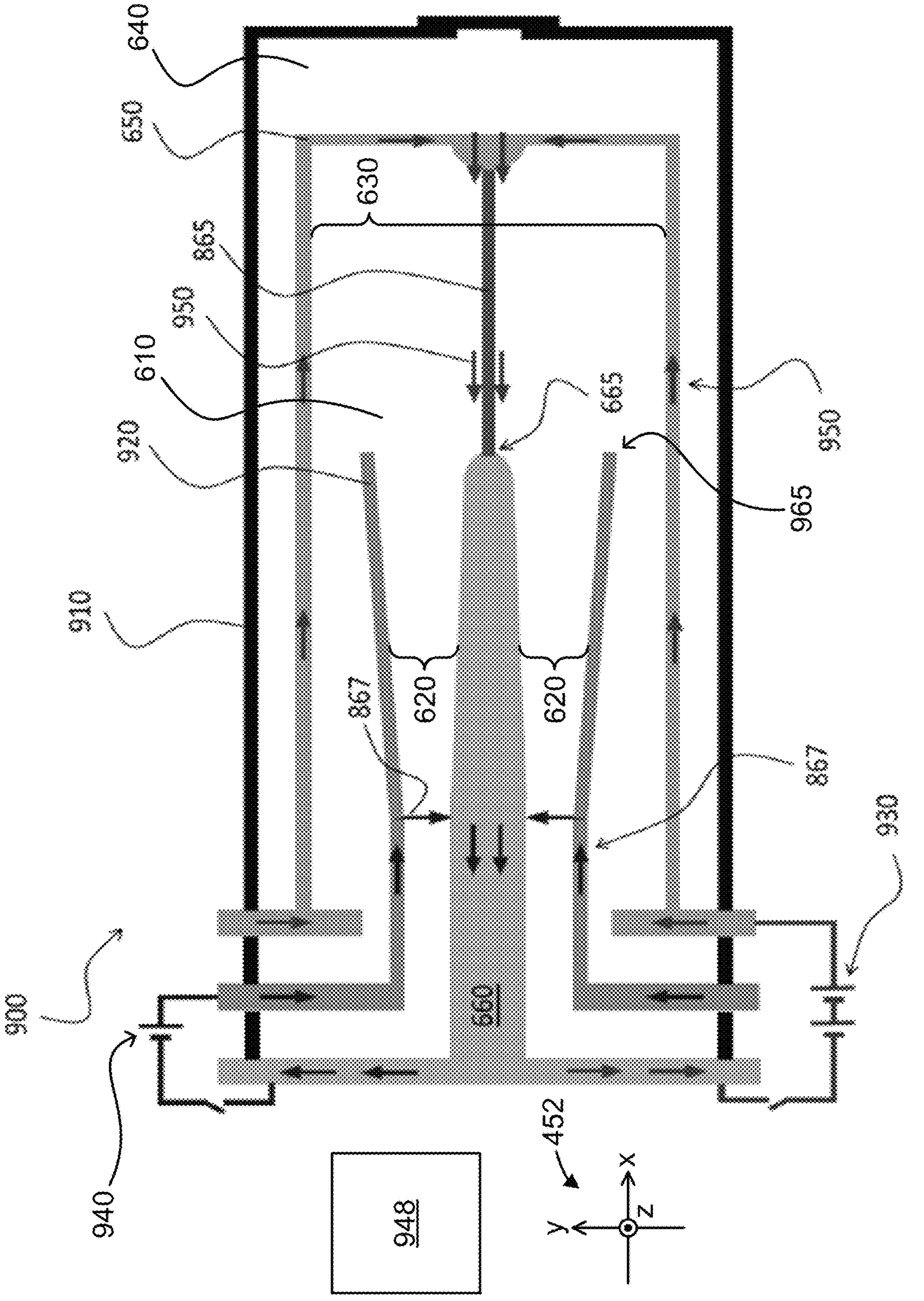
FIG. 4 shows a schematic cross-sectional diagram of a plasma confinement system including a plurality of electrodes, in accordance with at least one embodiment.

Referring now to FIG. 4, a schematic cross-sectional diagram of a plasma confinement system 900, such as may be included within a thermonuclear fusion reactor, is shown. The plasma confinement system 900 may generate a plasma arc within an assembly region 630 of a plasma confinement chamber 610, the plasma arc confined, compressed, and sustained by an axially symmetric magnetic field. The axially symmetric magnetic field may be stabilized by a sheared ion velocity flow driven by electrical discharge between a pair of electrodes interfacing with the plasma confinement chamber 610.

The plasma confinement system 900 may be assembled and configured similarly to the plasma confinement system 300 and may operate in a substantially similar manner in practice. The primary differences between the plasma confinement system 300 as depicted in FIG. 1 and the plasma confinement system 900 as depicted in FIG. 4 include relative positioning and spatial configuration of the intermediate electrode 303 (in FIG. 1) and relative positioning and spatial configuration of an intermediate electrode 920 (in FIG. 4), which will be discussed in greater detail below. Excepting certain assembly and operational aspects which may arise from such differences, the description provided above with reference to FIGS. 1-3F may be additionally applied to the embodiment depicted in FIG. 4. In certain embodiments, additional subsystems and/or functionalities may also be included in the plasma confinement system 900 which were not described in detail above with reference to FIGS. 1-3F and which may be additionally applied to the embodiments depicted in FIGS. 1-3F.

As such, in one embodiment, at least one of the pair of electrodes driving the sheared ion velocity flow is a static, solid electrode including an electrode material which supplements or increases thermonuclear fusion within the plasma confinement chamber 610 during generation of the plasma arc. In an additional or alternative embodiment, at least one of the pair of electrodes may be an in situ renewable electrode including a protective film of a flowing, liquid metal which may ablate from an external surface of the electrode upon interaction with the plasma arc and thereby mitigate high-discharge erosion of the external surface.

A set of Cartesian coordinate axes 452 is shown in FIG. 4 for contextualizing positions of the various components of the plasma confinement system 900. Specifically, x-, y-, and z-axes are provided which are mutually perpendicular to one another, where the x- and y-axes define a plane of the schematic cross-sectional diagram shown in FIG. 4 and the z-axis is perpendicular thereto. In some embodiments, a direction of gravity may be parallel to and coincident with any direction in the plane of the schematic cross-sectional diagram of FIG. 4. For example, the direction of gravity may be parallel and coincident with a positive direction of the x-axis. In additional or alternative embodiments, the direction of gravity may be within a plane defined by the y- and z-axes (e.g., parallel and coincident with a negative direction of the y-axis).

In an example embodiment, the plasma confinement system 900 may include an outer electrode 650 separated physically and functionally from an external vacuum boundary 910, the external vacuum boundary 910, together with portions of an inner electrode 660, forming a vacuum vessel 640 as a low pressure container including the plasma confinement chamber 610. The intermediate electrode 920 may be positioned so as to have a radius in between a radius of the inner electrode 660 and a radius of the outer electrode 650. Specifically, the intermediate electrode 920 may substantially surround the inner electrode 660 and the outer electrode 650 may substantially surround the intermediate electrode 920. For example, the inner electrode 660 may include one end 665 that is at least partially surrounded by the intermediate electrode 920 and the intermediate electrode 920 may include one end 965 that is at least partially surrounded by the outer electrode 650.

The plasma confinement system 900 may incorporate at least two functionally separate power supplies, e.g., at least one primary power supply 930 primarily arranged and controlled to drive a Z-pinch (discharge) current 950 ($I_{pinch}$) 1, and at least one additional power supply 940 primarily arranged and controlled to drive a residual current 867. In some embodiments, the at least one primary power supply 930 may be separate power supply device(s) from the at least one additional power supply 940. In other embodiments, the at least one primary power supply 930 and the at least one additional power supply 940 may be components of the same power supply device.

For example, in at least one embodiment, a single power supply device may have a plurality of outputs which individually provide an amount of power to enable performance of a respective function (e.g., drive the Z-pinch current 950, drive the residual current 867, etc.). Such an arrangement may be based on at least two power supplies (e.g., one primary power supply 930 and one additional power supply 940) and may allow for additional control of the Z-pinch current 950 and sheared flow stabilization thereof. In principle, the at least two power supplies may be scaled, charged, and controlled such that the Z-pinch current 950 and the stabilization thereof may be maintained for commensurate time periods before any of the at least two power supplies prematurely runs short or out of stored energy.

In certain embodiments, the plasma confinement system 900 may incorporate a "tapered electrodes" configuration, characterized by broadening a gap between the inner electrode 660 and the intermediate electrode 920 by tapering, along the x-axis, the end 965 of the intermediate electrode 920 outwards to increase a volume of at least a portion of the acceleration region 620, e.g., in a direction of the (unsupported) ends 665 and 965. In one example, the taper may be between 0 and 15 degrees from a central axis of the plasma confinement system 900 (e.g., parallel to the x-axis). Such an arrangement may facilitate a transfer of momentum from plasma heated by the residual current 867 to neutral gas, e.g., along a positive direction of the x-axis, thereby creating and sustaining sheared flow stabilization. The momentum transfer may be described and modeled using methodology applicable to design/optimization of "de Laval nozzles" as known in the field of jet propulsion.

While techniques described herein are discussed in connection with thermonuclear fusion and, for example, harnessing energy production therefrom, the techniques described herein can be used for other purposes, such as heat generation (e.g., for manufacturing utilizing relatively high temperatures) and propulsion. For example, the plasma confinement system 300 of FIG. 1 or the plasma confinement system 900 of FIG. 4 may be modified at least by removing the vacuum chamber 338 or the external vacuum boundary 910, respectively, and introducing an opening in one end of the outer electrode 650 to allow fusion products to escape (e.g., parallel to the x-axis). In one embodiment, a magnetic nozzle (not shown at FIG. 4) is positioned downstream of the outer electrode 650, e.g., to the right of the outer electrode 650 with respect to the x-axis, to collimate the plasma to reduce any exhaust plume divergence.

The plasma confinement system 900 may include a controller or other computing device 948, which may include non-transitory memory on which executable instructions may be stored. The executable instructions may be executed by one or more processors of the controller 948 to perform various functionalities of the plasma confinement system 900. Accordingly, the executable instructions may include various routines for operation, maintenance, and testing of the plasma confinement system 900. The controller 948 may further include a user interface at which an operator of the plasma confinement system 900 may enter commands or otherwise modify operation of the plasma confinement system 900. The user interface may include various components for facilitating operator use of the plasma confinement system 900 and for receiving operator inputs (e.g., requests to generate plasma arcs for thermonuclear fusion, etc.), such as one or more displays, input devices (e.g., keyboards, touchscreens, computer mice, depressible buttons, mechanical switches or other mechanical actuators, etc.), lights, etc. The controller 948 may be communicably coupled to various components (e.g., valves, power supplies, etc.) of the plasma confinement system 900 to command actuation and use thereof (wired and/or wireless communication paths between the controller 948 and the various components are omitted from FIG. 4 for clarity).

Figure 5:
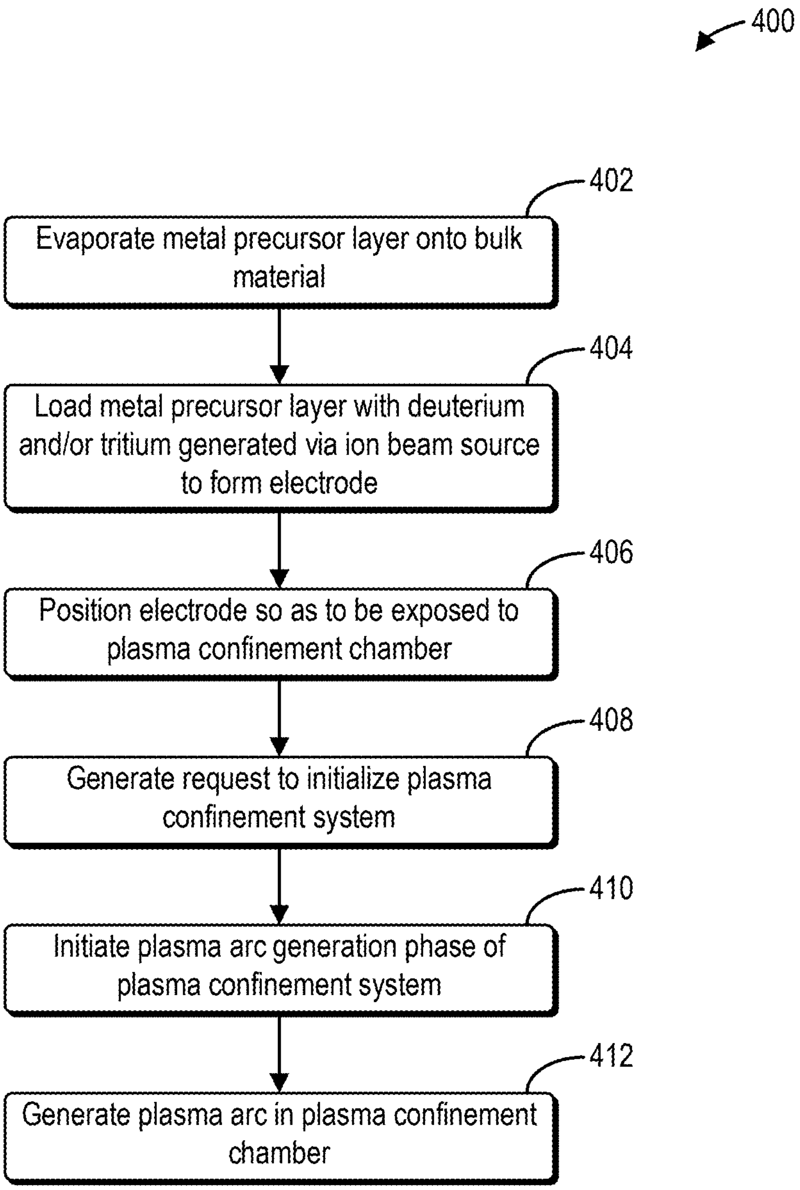
FIG. 5 shows a block diagram of a method for forming an electrode and operating a plasma confinement system therewith, in accordance with at least one embodiment.

Referring now to FIG. 5, a block diagram of a method 400 for operating a plasma confinement system, such as any of the plasma confinement systems described in detail above with reference to FIGS. 1-4, and forming an electrode therefor, where the electrode may be formed with an electrode material which supplements or increases thermonuclear fusion during the operation of the plasma confinement system, is shown. In an example embodiment, the electrode material may be a metal hydride, such as a deuteride and/or a tritide including one or more of Ti, Zr, Sc, Mg, V, or $^6$Li (e.g., $TiD_2$, $^6$LiD, etc.), or any alloy formed by any combination of one or more of the preceding metals. The metal hydride may decompose to provide hydronic fuel gas (e.g., $H_2$, $D_2$, $T_2$) when exposed to operational temperatures of the plasma confinement system (e.g., during application of a Z-pinch discharge current to generate a plasma arc), and may supply free neutrons upon ionic bombardment (e.g., with deuterium and/or tritium) and/or free tritium atoms upon neutronic bombardment.

In some embodiments, the method 400, or a portion thereof, may be implemented as executable instructions stored in non-transitory memory of a computing device, such as a controller communicably coupled to the plasma confinement system. Moreover, in certain embodiments, additional or alternative sequences of steps may be implemented as executable instructions on such a computing device, where individual steps discussed with reference to the method 400 may be added, removed, substituted, modified or interchanged.

At block 402, the method 400 may include evaporating a metal precursor layer onto a bulk material. In some embodiments, the bulk material may include a metal, such as copper (Cu), tungsten (W), or Ti. In additional or alternative embodiments, the metal precursor layer may include one or more of Ti, Zr, Sc, Mg, V, $^6$Li, or any alloy formed by any combination of one or more of the preceding metals. The metal precursor layer may be formed to be less than, or within a threshold range of, a predetermined thickness. In an example embodiment, the predetermined thickness may be a millimeter (e.g., on an order of hundreds of microns).

In an example embodiment, the bulk material may form a shaft (e.g., a substantially cylindrical body) ending in a nosecone. In one example, the metal precursor layer may be evaporated on only the nosecone. To confine the metal precursor layer to cover only a portion (e.g., the nosecone) of the bulk material, the bulk material may be masked so that the metal precursor layer may be evaporated on only an exposed, unmasked portion (e.g., the nosecone) of the bulk material.

At block 404, the method 400 may include loading the metal precursor layer with deuterium and/or tritium generated via an ion beam source to form an electrode for the plasma confinement system. In an example embodiment, the ion beam source may be external to and separate from the plasma confinement system. Though in other embodiments the metal precursor layer may be loaded during operation of the plasma confinement system (e.g., via the plasma arc generated by application of the Z-pinch discharge current) and thus the loading may additionally or alternatively occur following block 406 (see below), the external ion beam source may load the deuterium and/or tritium at an appreciably faster rate. For example, the external ion beam source may be a 10 to 100 kV deuterium ion source which may optionally load tritium ions as well. In other examples, the tritium ions may be loaded via an additional external ion beam source. Example ion implantation depths in Ti (which may, in some examples, form the metal precursor layer) are provided in FIG. 6 for H, D, T, $^3$He, and $^4$He ions.

In an example embodiment, upon loading of the metal precursor layer with deuterium and/or tritium, an electrode material layer (e.g., a metal layer loaded with deuterium and/or tritium) may be formed on the bulk material. The electrode material layer may include a metal hydride having the formula of $MH_n$ (e.g., a metal deuteride having the formula of $MD_n$ and/or a metal tritide having the formula of $MT_n$), where n is a molar ratio of hydrogen atoms (e.g., any one of various hydrons, including D and/or T) to metal ions M in the solid phase. For example, n may be 2, such as in $TiH_2$ (e.g., $TiD_2$ and/or $TiT_2$). Continuing with the example of $TiH_2$, for a given mass of Ti $m_{Ti}$ in the electrode material layer, a number of Ti atoms $N_{Ti}$ may be given as:

$$N_{Ti} = m_{Ti}\frac{6.02\times 10^{23}\ \text{mol}^{-1}}{48\ \text{g}\cdot\text{mol}^{-1}} \tag{4}$$

where the Avogadro constant is approximated as $6.02\times10^{23}$ $\text{mol}^{-1}$ and the atomic mass of Ti is approximated at 48

$g \cdot mol^{-1}$. Applying equation (4) to $TiH_2$ including $m_{Ti}$=1 g, $N_{Ti} \approx 1.25 \times 10^{22}$ and a number of H atoms is $2N_{Ti} \approx 2.5 \times 10^{22}$.

At block 406, the method 400 may include positioning the electrode so as to be exposed to a plasma confinement chamber of the plasma confinement system. In an example embodiment, the plasma confinement chamber may be partitioned into an acceleration region and an assembly region, wherein the electrode may be positioned so as to be exposed to each of the acceleration region and the assembly region. As an example, the electrode may be an inner electrode coaxial with the plasma confinement chamber so as to extend through the acceleration region such that an end of the inner electrode may be exposed to the assembly region. As an additional or alternative example, the electrode may be an outer electrode at least partially circumferentially surrounding the inner electrode and at least partially defining an outer boundary of each of the acceleration region and the assembly region. As another example, the electrode may be an intermediate electrode at least partially circumferentially surrounding the inner electrode and at least partially defining an outer boundary of the acceleration region, extending such that an end of the intermediate electrode may be exposed to the assembly region.

At block 408, the method 400 may include generating a request to initialize the plasma confinement system, according to which an initialization phase of the plasma confinement system may be initiated. In an example embodiment, the request may be generated responsive to receiving a user input, e.g., from an operator of the plasma confinement system. For instance, initialization of the plasma confinement system may be triggered or otherwise initiated via an operator interacting with a user interface, e.g., a push button switch, toggle switch, or other mechanical actuator, a keyboard, a touchscreen, a cursor input, etc.

At block 410, the method 400 may include initiating a plasma arc generation phase of the plasma confinement system, e.g., following the initialization phase. Specifically, in an example embodiment, the plasma arc generation phase may be initiated at least by powering up the plasma confinement system (e.g., one or more power supplies may supply power to various components utilized during the plasma arc generation phase) and providing fuel gas for forming a plasma to the plasma confinement chamber by increasing one or more valve openings. In an example embodiment, the fuel gas may include one or more of $D_2$ or $T_2$.

At block 412, the method 400 may include generating the plasma arc in the plasma confinement chamber, e.g., during the plasma arc generation phase. In an example embodiment, the Z-pinch discharge current may be applied at a repetition rate between the electrode including the electrode material layer and another electrode to generate the plasma arc. Accordingly, during operation of the plasma confinement system, the electrode may function as either a cathode in some embodiments or an anode in other embodiments. The Z-pinch discharge current may be stabilized by a sheared ion velocity flow created and maintained via an applied residual current. As a result of the plasma arc generation, the electrode may be heated and/or the electrode may be bombarded with deuterium, tritium, and free neutrons (e.g., resulting from thermonuclear fusion within the plasma arc). An amount of heat generated at the electrode and/or ionic/neutronic bombardment may depend on a position of the electrode in relation to the plasma arc (e.g., whether or not the plasma arc is directly interacting with the electrode).

In an example embodiment, the metal hydride included in the electrode material layer may decompose to a metal and the fuel gas (e.g., via equation (2)) when the electrode is heated to a decomposition temperature during operation of the plasma confinement system to generate the plasma arc. Example isothermal pressures for decomposition of various $TiH_n$ species are provided in FIG. 7.

In an additional or alternative embodiment, the metal hydride included in the electrode material layer may release or expel free neutrons upon ionic bombardment of the metal hydride. Specifically, the deuterium and/or tritium from the plasma arc may interact with hydrons in the metal hydride via a thermonuclear fusion reaction (e.g., reaction (1)) to generate $^4He$ and free neutrons.

In an additional or alternative embodiment wherein the metal hydride includes $^6Li$, the metal hydride included in the electrode material layer may release or expel free tritium atoms upon neutronic bombardment of the metal hydride. Specifically, free neutrons from the plasma arc may interact with $^6Li$ in the metal hydride (e.g., via reaction (3)) to generate tritium, as well as deuterium and $^4He$.

In certain embodiments, the metal hydride may be replenished after depletion thereof following a duration of use of the plasma confinement system. For example, the duration of use may be 1000 hours.

Figure 6:
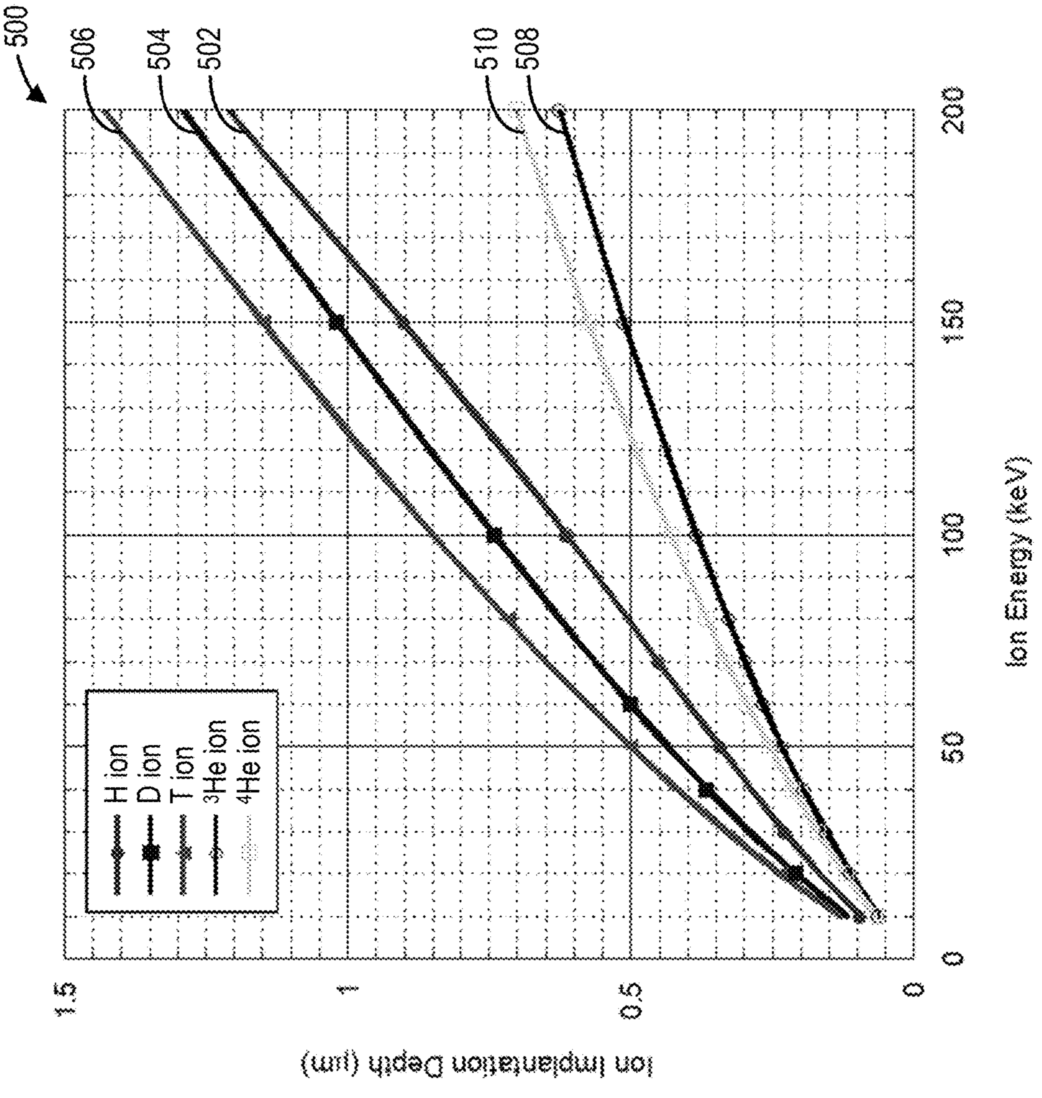
FIG. 6 shows a plot of a plurality of ion implantation depths in titanium as a function of ion energy for example ions.

Referring now to FIG. 6, a plot 500 of ion implantation depth in Ti as a function of ion energy is shown for various example ions. The Ti may be included, for example, in a bulk material or in a relatively thin layer or film disposed on a bulk material. In the plot 500, an abscissa indicates the ion energy (in keV) and an ordinate indicates the ion implantation depth (in μm). The ion implantation depths for H, D, T, $^3He$, and $^4He$ ions in Ti are plotted in curves 502, 504, 506, 508, and 510, respectively. As shown, for a given ion energy plotted in the plot 500, the ion implantation depth may increase according to a sequential order of $^3He$, $^4He$, H, D, and T. Accordingly, for a given ion implantation depth, higher energy ion beams may be utilized to implant D and T in Ti as compared to ion beams utilized for H, $^3He$, and $^4He$.

Figure 7:
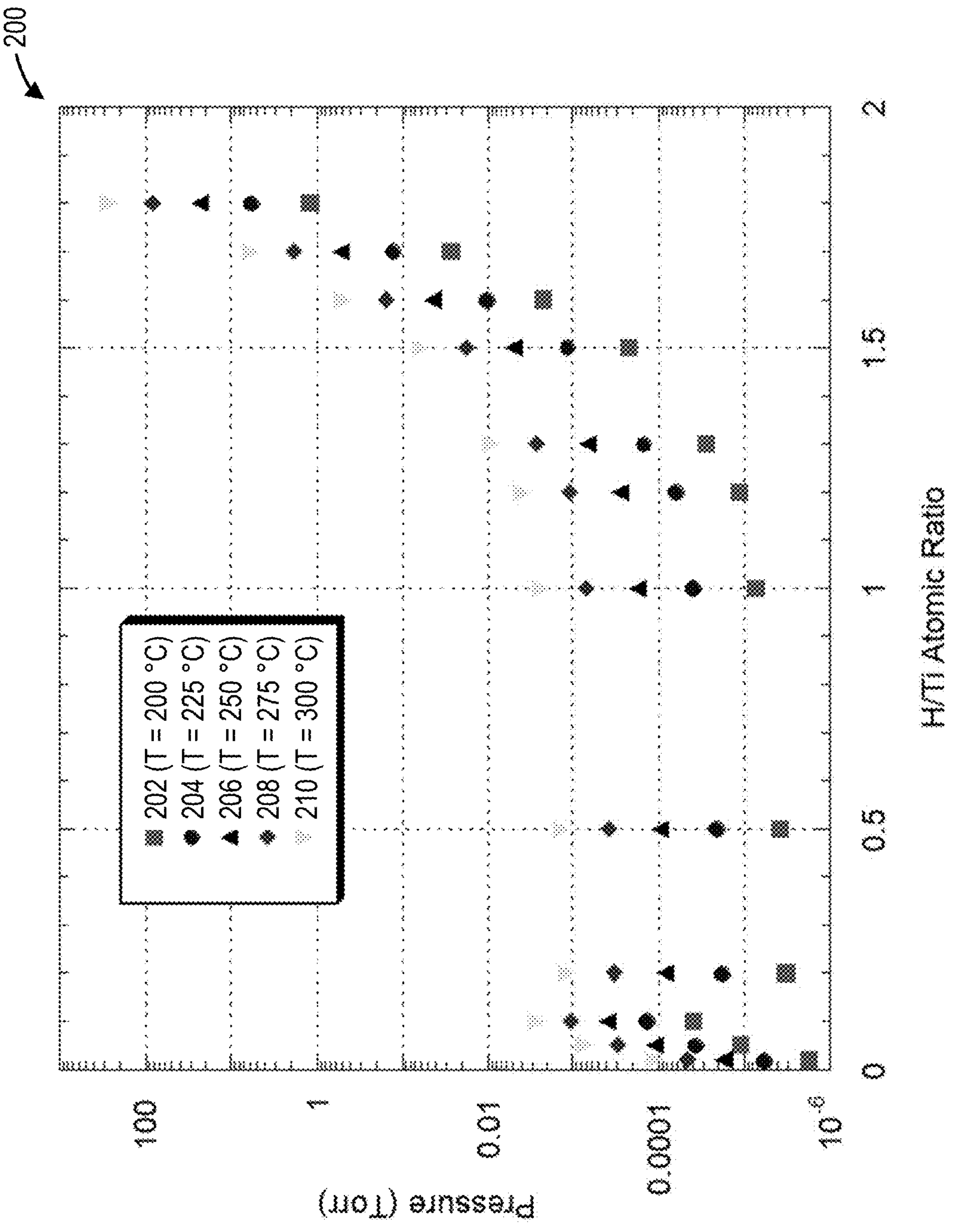
FIG. 7 shows a plot of a plurality of isothermal pressures as a function of H:Ti atomic ratio in example titanium hydrides.

Referring now to FIG. 7, a plot 200 of isothermal pressure as a function of H:Ti atomic ratio n is shown for various example titanium hydrides ($TiH_n$). In the plot 200, an abscissa indicates the H:Ti atomic ratio on a linear scale and an ordinate indicates the isothermal pressure (in Torr) on a logarithmic scale. The isothermal pressure values are plotted for steady-state decomposition of $TiH_n$ at various fixed temperatures, including 200° C. (points 202), 225° C. (points 204), 250° C. (points 206), 275° C. (points 208), and 300° C. (points 210). As shown, for a given H:Ti atomic ratio in the plot 200, the isothermal pressure may increase with increasing temperature. Moreover, for a given temperature, the isothermal pressure may trend upwards with increasing H:Ti atomic ratio. Accordingly, higher temperatures and higher H:Ti atomic ratios may generate higher pressures as a result of decomposition of $TiH_n$ to Ti and $H_2$.

Figure 8A:
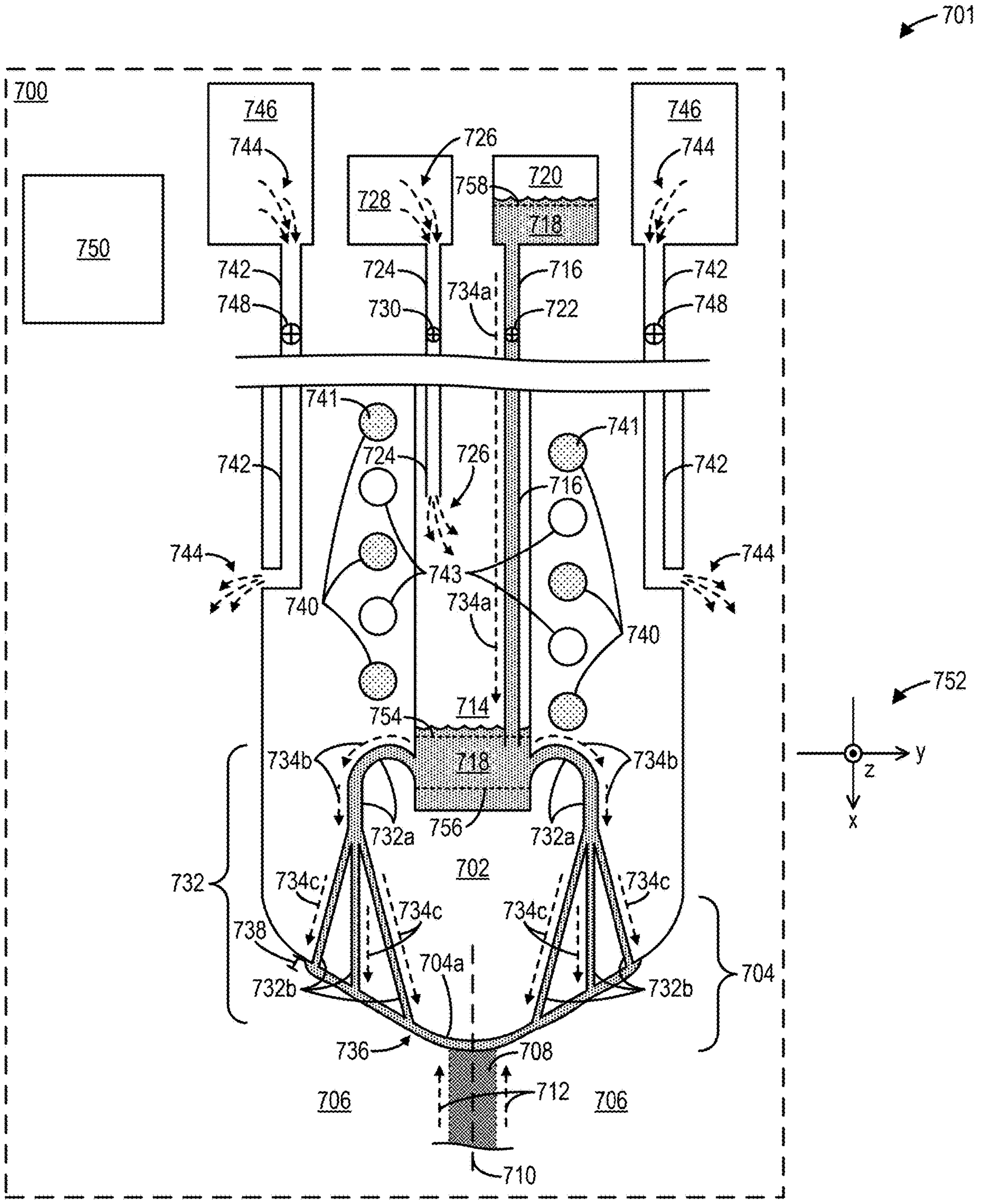
FIG. 8A shows a schematic cross-sectional diagram of an electrode in a plasma confinement chamber of a thermonuclear fusion reactor during operation thereof, in accordance with at least one embodiment.
Figure 8B:
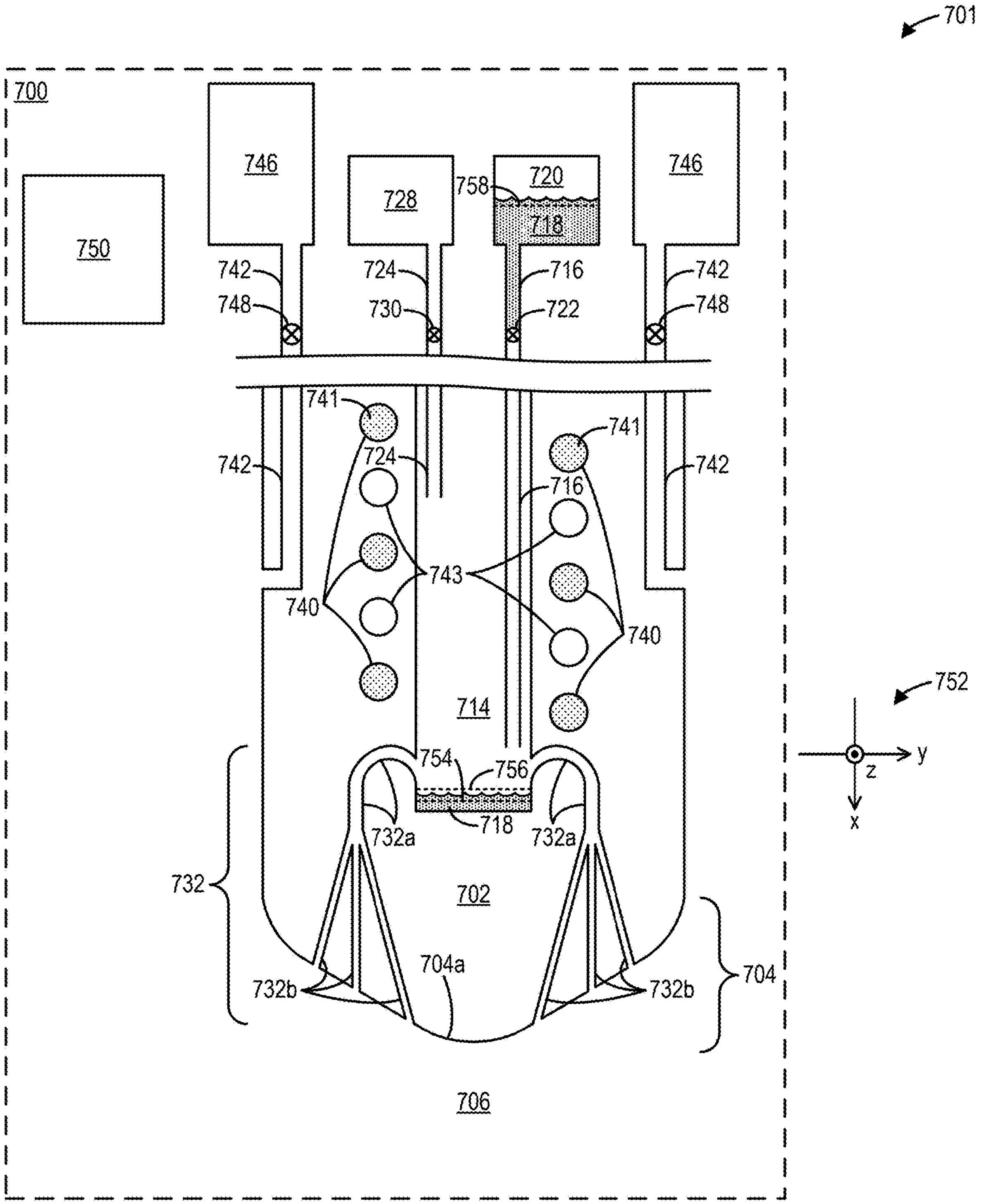
FIG. 8B shows a schematic cross-sectional diagram of the electrode of FIG. 8A prior to or following operation of the thermonuclear fusion reactor, in accordance with at least one embodiment.

Referring now to FIGS. 8A and 8B, schematic cross-sectional diagrams of an electrode 702 (also referred to herein as an electrode body 702 or an in situ renewable electrode 702) in a plasma confinement chamber 706 of a plasma confinement system 700 for a thermonuclear fusion reactor 701 are respectively shown. Specifically, the schematic cross-sectional diagram of FIG. 8A depicts the electrode 702 and the plasma confinement chamber 706 during operation of the thermonuclear fusion reactor 701 and the schematic cross-sectional diagram of FIG. 8B depicts the electrode 702 and the plasma confinement chamber 706 prior to and following operation of the thermonuclear fusion reactor 701. During operation of the thermonuclear fusion reactor 701, a plasma arc 708 may be generated and subsequently confined, compressed, and sustained by an axially symmetric magnetic field. The axially symmetric magnetic field may be stabilized by a sheared ion velocity flow driven by electrical discharge between the electrode 702 and at least one additional electrode interfacing with the plasma confinement chamber 706.

The electrode 702 may be referred to as an in situ renewable electrode 702 in that the electrode 702 may include a protective film 736 (also referred to herein as a meniscus 736) of a liquid metal 718 which may flow continuously (e.g., without interruption or with no appreciable delay) and ablate from an external surface 704*a* of the electrode 702 upon interaction with the plasma arc 708 generated during operation of the thermonuclear fusion reactor 701. As a portion of the electrode 702 interacting with the plasma arc 708 may be continuously replenished with the flowing, liquid metal 718, erosion of the external surface 704*a* (and thereby of the electrode 702 as a whole) during operation of the thermonuclear fusion reactor 701 may be mitigated or altogether obviated.

Though the electrode 702 is described below in the context of the plasma confinement chamber 706, the electrode 702 may be positioned in any of the plasma confinement systems described hereinabove as a replacement for an electrode therein. As an example, the electrode 702 may replace the inner electrode 302 included in the plasma confinement system 300 described in detail above with reference to FIGS. 1 and 3A-3F. As another example, the electrode 702 may replace the inner electrode 660 of the plasma confinement system 900 described in detail above with reference to FIG. 4. Moreover, only a portion of the plasma confinement system 700 (and thereby the thermonuclear fusion reactor 701) is shown in FIGS. 8A and 8B and other components (e.g., additional electrodes, power supplies, insulators, etc.) may be added, removed, substituted, modified or interchanged, such as one or more components from the plasma confinement system 300 and/or the plasma confinement system 900.

A set of Cartesian coordinate axes 752 is shown in FIGS. 8A and 8B for contextualizing positions of the various components of the thermonuclear fusion reactor 701 and for comparing between the schematic cross-sectional diagrams of FIGS. 8A and 8B. Specifically, x-, y-, and z-axes are provided which are mutually perpendicular to one another, where the x- and y-axes define a plane of each of the schematic cross-sectional diagrams of FIGS. 8A and 8B and the z-axis is perpendicular thereto. In some embodiments, a direction of gravity may be parallel to and coincident with any direction in the plane of the schematic cross-sectional diagrams of FIGS. 8A and 8B. In one example, and as discussed in examples described hereinbelow, the direction of gravity may be parallel and coincident with a positive direction of the x-axis. In additional or alternative embodiments, the direction of gravity may be within a plane defined by the y- and z-axes (e.g., parallel and coincident with a negative direction of the y-axis).

In an example embodiment, the electrode 702 may be formed in a substantially cylindrical shape having with a tapered, rounded base or nosecone 704. Additionally or alternatively, the electrode 702 may be elongated along the x-axis, such that a length of the electrode 702 along the x-axis is longer than a length of the electrode 702 along the y- and z-axes.

In an example embodiment, the electrode 702 may be formed from a relatively high purity material, e.g., so as to preclude formation of (unexpected) activation products during neutronic bombardment. Additionally or alternatively, the electrode 702 (e.g., the nosecone 704 thereof) may be cast or additively manufactured from a material selected for relatively high resistance to neutron damage, such as silicon carbide. In some embodiments, the electrode 702 may include one or more of a metal (e.g., Cu and/or W), graphite, or a semiconductor (e.g., silicon carbide).

In some embodiments, the electrode 702 may be formed as a unitary component inclusive of the nosecone 704. In other embodiments, the nosecone 704 may be removably fastened or fixedly adhered to another portion/surface of the electrode 702. Accordingly, in some examples, one or more fasteners or other locking structures may be provided to removably fix the nosecone 704 in position. In other examples, the nosecone 704 may be welded or otherwise adhered (e.g., with an adhesive) in position. In additional or alternative embodiments, the nosecone 704 may be electrically coupled to another portion/surface of the electrode 702 via electrical lines/wires or by forming components of the electrode 702 (including the nosecone 704) from one or more electrically conductive materials which transfer electrical current between the components when the components are placed in physical contact with one another.

The electrode 702 may be at least partially enclosed or otherwise contained within the plasma confinement chamber 706. For example, a majority of the electrode 702 may be circumferentially surrounded by the plasma confinement chamber 706 with one end of the electrode 702 (not shown in FIGS. 8A and 8B) extending from the plasma confinement chamber 706 in a negative direction of the x-axis and/or forming one wall of the plasma confinement chamber 706.

During operation of the thermonuclear fusion reactor 701, the plasma arc 708 may be generated by applying a discharge current between the electrode 702 and at least one additional electrode (not shown at FIGS. 8A and 8B). As a result of the axially symmetric magnetic field generated by the discharge current, the plasma arc 708 may be confined and compressed so as to flow toward the electrode 702 along a central axis 710 (e.g., parallel to the x-axis, the plasma arc 708 flowing in the negative direction thereof), as indicated by arrows 712.

The electrode 702 may be positioned such that a central axis of the substantially cylindrical shape is coincident with the central axis 710 of the plasma arc 708. Accordingly, the external surface 704*a* of the electrode 702, more specifically, at the nosecone 704, may intersect with the central axis 710 of the plasma arc 708 during generation and confinement thereof. As such, the plasma confinement chamber 706 may entirely surround an exterior of the nosecone 704.

The electrode 702 may include an internal reservoir 714 enclosed or otherwise contained therein. In an example embodiment, the internal reservoir 714 may occupy a core region of the electrode 702, e.g., extending along the central axis thereof and radially symmetric thereabout. As described below, the electrode 702 may include a plurality of channels including a first portion for flowing the liquid metal 718 to the internal reservoir 714, a second portion for flowing an inert gas 726 to the internal reservoir 714, a third portion for flowing the liquid metal 718 from the internal reservoir 714 to the exterior of the nosecone 704, and a fourth portion for flowing a heat exchange fluid 741 to maintain or adjust (e.g., increase or decrease, depending upon an operational mode or one or more conditions of the plasma confinement system 700) a temperature of the electrode 702 and/or a temperature of the liquid metal 718.

The internal reservoir 714 may contain at least a portion of the liquid metal 718, the liquid metal 718 fed to the internal reservoir 714 via a liquid metal supply channel 716 (e.g., formed as a conduit or a pipe) as indicated by an arrow 734*a*. Specifically, the liquid metal supply channel 716 may fluidly couple the internal reservoir 714 to a liquid metal source 720 (e.g., a pressurized storage tank), the liquid metal source 720 positioned external to the plasma confinement chamber 706. The liquid metal source 720 may contain at least a portion of the liquid metal 718 which may be controllably fed to the internal reservoir 714 (see the arrow 734*a*) via actuation of a valve 722 (e.g., controlled by a corresponding regulator; not shown at FIGS. 8A and 8B). The valve 722 is shown in FIG. 8A in an open position to allow the liquid metal 718 to substantially freely flow to the internal reservoir 714, though the valve 722 may also be placed in a closed position (see FIG. 8B) to prevent the liquid metal 718 from flowing from the liquid metal source 720 to the internal reservoir 714. In some embodiments, the valve 722 may be continuously variable, such that the valve 722 may take on a range of partially open positions which permit greater flow than the closed position and less flow than the open position.

In an example embodiment, the liquid metal 718 may include any metal which may be present in a liquid state under operating temperatures of the thermonuclear fusion reactor 701. Additionally or alternatively, the liquid metal 718 may be selected for relatively high resistance to neutron damage (in certain embodiments, the liquid metal 718 may be more resistant to neutron damage than a composition of the electrode 702). Moreover, radiative losses may scale with quantity and atomic number of contaminants. Accordingly, the liquid metal 718 may include lithium (Li), for example. In additional or alternative examples, an additive may be included, e.g., to modify viscosity, surface tension, etc. In certain examples, the additive may be selected for reduced toxicity and flammability. As one example, the liquid metal 718 may include bismuth (Bi) and/or lead (Pb), e.g., in the form of a Li compound/composite/alloy including Bi and/or Pb. In other embodiments, liquid lithium hydride may supplant some or all of the liquid metal 718 for similar purposes, e.g., for forming the protective film 736 on the external surface 704*a*.

The internal reservoir 714 may further contain at least a portion of the inert gas 726, the inert gas 726 fed to the internal reservoir 714 via an inert gas supply channel 724 (e.g., formed as a conduit or a pipe). Specifically, the inert gas supply channel 724 may fluidly couple the internal reservoir 714 to an inert gas source 728 (e.g., a pressurized storage tank), the inert gas source 728 positioned external to the plasma confinement chamber 706. The inert gas 726 is depicted as arrows in FIG. 8A, the arrows directed in a flow direction of the inert gas 726 when the inert gas 726 is being supplied to the internal reservoir 714 during operation of the thermonuclear fusion reactor 701. The inert gas source 728 may contain any remaining portion of the inert gas 726 (e.g., any remaining inert gas 726 excepting the portion contained within the inert gas source 728), which may be controllably fed to the internal reservoir 714 via actuation of a valve 730 (e.g., controlled by a corresponding regulator; not shown at FIGS. 8A and 8B). The valve 730 is shown in FIG. 8A in an open position to allow the inert gas 726 to substantially freely flow to the internal reservoir 714, though the valve 730 may also be placed in a closed position (see FIG. 8B) to prevent the inert gas 726 from flowing from the inert gas source 728 to the internal reservoir 714. In some embodiments, the valve 730 may be continuously variable, such that the valve 730 may take on a range of partially open positions which permit greater flow than the closed position and less flow than the open position.

In an example embodiment, the inert gas 726 may include any gas which does not appreciably react with or otherwise degrade the liquid metal 718 and the electrode 702. For example, the inert gas 726 may include helium (He). In additional or alternative examples, the inert gas 726 may include one or more noble gases [neon (Ne), argon (Ar), krypton (Kr), xenon (Xe), radon (Rn), etc.].

During operation of the thermonuclear fusion reactor 701, the liquid metal 718 in the internal reservoir 714 may be maintained at, above, or within a threshold range of a liquid metal level 754, the liquid metal level 754 preselected to maintain a liquid metal flow rate for formation and sustainment of the protective film 736. Accordingly, in some embodiments, the liquid metal level 754 may be adjusted so as to maintain the liquid metal flow rate. Additionally or alternatively, the liquid metal level 754 may be adjusted responsive to a liquid metal level 758 corresponding to an amount of the liquid metal 718 remaining in the liquid metal source 720 (e.g., the liquid metal level 754 may be progressively decreased responsive to the liquid metal level 758 progressively decreasing). Sensors positioned within the internal reservoir 714 and the liquid metal source 720 (not shown at FIGS. 8A and 8B) may monitor the liquid metal levels 754 and 758, respectively.

The electrode 702 may include a plurality of internal liquid flow channels 732 fluidly coupling the internal reservoir 714 to the exterior of the nosecone 704. Each of the plurality of internal liquid flow channels 732 may include: a main liquid flow channel 732*a* fluidly coupled to and extending from the internal reservoir 714, and a plurality of liquid flow capillaries 732*b* which fluidly couple the main liquid flow channel 732*a* to the exterior of the nosecone 704.

In an example embodiment, the central axis of the electrode 702 may be coaxial with the direction of gravity, the direction of gravity being coincident with the positive direction of the x-axis. Accordingly, the nosecone 704 may be positioned below the internal reservoir 714 with respect to the direction of gravity. Moreover, upon extending from the internal reservoir 714, each of the plurality of internal liquid flow channels 732 (e.g., the main liquid flow channel 732*a* thereof) may be initially oriented upwards and opposite the nosecone 704. After orienting upwards, each of the plurality of internal liquid flow channels 732 (e.g., the main liquid flow channel 732*a* thereof) may arch downwards and towards the nosecone 704. As such, a combined force from an amount of the liquid metal 718 supplied to the internal reservoir 714 (corresponding to the liquid metal level 754) and the inert gas pressure within the internal reservoir 714 may overcome gravitational force to flow the liquid metal 718 through the initially upward orientation of the plurality of internal liquid flow channels 732, after which gravitational force may assist in increasing the liquid metal flow rate.

At least a portion of the liquid metal 718 may be fed from the internal reservoir 714 and along the plurality of internal liquid flow channels 732 to the external surface 704*a*. Specifically, for each of the plurality of internal liquid flow channels 732, the liquid metal 718 may flow along the main liquid flow channel 732*a*, as indicated by arrows 734*b*, to the plurality of liquid flow capillaries 732*b* and along the plurality of liquid flow capillaries to the external surface

704*a*, as indicated by arrows 734*c*. Though the plurality of liquid flow capillaries 732*b* are depicted in FIGS. 8A and 8B as being fluidly coupled to the external surface 704*a* at the nosecone 704 and on either side of the central axis 710 of the plasma arc 708 with respect to the y-axis, in other embodiments, at least a portion of the plurality of liquid flow capillaries 732*b* may be fluidly coupled to the external surface 704*a* at the nosecone 704 so as to intersect with the central axis 710 and/or at least a portion of the plurality of liquid flow capillaries 732*b* may be fluidly coupled to other portions of the external surface 704*a* apart from the nosecone 704 altogether.

Upon flowing to the external surface 704*a*, at least a portion of the liquid metal 718 may form the protective film 736 between the external surface 704*a* and the exterior of the nosecone 704. The protective film 736 may be retained (e.g., anchored, adhered, or otherwise retained) on the external surface 704*a* at least via capillary action induced by the plurality of liquid flow capillaries 732*b*. The protective film 736, being retained on the nosecone 704 and substantially symmetric about the central axis of the electrode 702, may be positioned so as to directly interact with the plasma arc 708 during operation of the thermonuclear fusion reactor 701 (that is, the protective film 736 may be positioned such that the plasma arc 708 physically interacts with the protective film 736 absent any intervening components or volumes).

As such, a portion of the liquid metal 718 may be fed (e.g., from the liquid metal source 720) to the internal reservoir 714 and along the plurality of internal liquid flow channels 732 to the external surface 704*a*. A remaining portion of the liquid metal 718 (e.g., any remaining liquid metal 718 excepting the portion contained within the electrode body 702 and being fed to the external surface 704*a*) may form the protective film 736 on the external surface 704*a*.

During operation of the thermonuclear fusion reactor 701, portions of the protective film 736 may ablate from the external surface 704*a* at a liquid metal ablation rate via interaction with the plasma arc 708 and the high discharge current sustaining the plasma arc 708. The portions of the protective film 736 ablating from the external surface 704*a* may be continuously (e.g., without interruption or with no appreciable delay) replenished by the liquid metal 718 flowing to the external surface 704*a* from the internal reservoir 714 at the liquid metal flow rate.

In embodiments wherein the direction of gravity is not parallel to the positive direction of the x-axis, the protective film 736 may extend at least partially down the external surface 704*a* and below the nosecone 704 along a negative direction of the x-axis. In such embodiments, various structures may be provided on the electrode 702 or within the plasma confinement system 700 so that the flowing liquid metal 718 may not interfere with operation of the plasma confinement system 700. For example, ports/openings along the external surface 704*a* (e.g., for one or more fuel gas supply channels 742) may extend from the external surface 704*a* parallel to a plane defined by the y- and z-axes and/or a drain/trough may be provided at a base of the electrode 702 opposite to the nosecone 704 with respect to the x-axis to collect excess liquid metal 718. In additional or alternative embodiments wherein the direction of gravity is not parallel to the positive direction of the x-axis, the protective film 736 may be asymmetric about the central axis 710 of the plasma arc 708. However, in any of the preceding embodiments, the protective film 736 may still intersect with the central axis 710 of the plasma arc 708 during operation of the plasma confinement system 700 so as to be positioned between the plasma arc 708 and the external surface 704*a*.

The electrode 702 may include one or more heat exchange fluid flow channels 740 containing the heat exchange fluid 741. In an example embodiment, the heat exchange fluid 741 may maintain a temperature of the liquid metal 718 (e.g., of the protective film 736 formed a portion of the liquid metal 718) and/or a portion or substantially an entirety of the electrode 702. In some embodiments, a plurality of heat exchange fluid flow channels 740 may be included in the electrode 702, e.g., with each heat exchange fluid flow channel 740 maintaining the temperature of a different portion or component of the electrode 702. In other embodiments, only one heat exchange fluid flow channel 740 may be included in the electrode 702, e.g., coiled about the central axis thereof so as to extend along a portion or substantially an entirety of a length of the electrode 702 along the x-axis. In an example embodiment, the one or more heat exchange fluid flow channels 740 may be separate and fluidly decoupled from the plasma confinement chamber 706 and the internal reservoir 714, and from the plurality of internal liquid flow channels 732 therebetween. In additional or alternative embodiments, an internal heating element/device 743 (e.g., depicted in FIGS. 8A and 8B as an internal heating coil, such as a mineral-insulated cable, interleaved with the one or more heat exchange fluid flow channels 740, though other configurations are possible) may be thermally coupled to (e.g., positioned within) the internal reservoir 714 so as to emit heat and thereby provide greater control of temperature maintenance/modulation (e.g., heating and cooling functions may be split between the internal heating element/device 743 and the one or more heat exchange fluid flow channels 740). In additional or alternative embodiments, an additional heating element/device (not shown at FIGS. 8A and 8B) may be thermally coupled to the liquid metal source 720. In such embodiments, actuation of the additional heating element/device may adjust the temperature of the liquid metal 718 within the liquid metal source 720, e.g., to melt/liquify the liquid metal 718 or otherwise adjust the liquid metal flow rate prior to the liquid metal 718 being flowed to the internal reservoir 714.

In an example embodiment, the heat exchange fluid 741 may include one or more of a liquid metal (e.g., liquid lithium or mixtures therewith), a molten salt (e.g., as an insulating fluid), water, or an inert gas. Accordingly, in certain embodiments, one or both of the liquid metal 718 and the heat exchange fluid 741 may be liquid lithium.

During operation of the thermonuclear fusion reactor 701, the plasma confinement chamber 706 may contain at least a portion of a fuel gas 744, the fuel gas 744 fed to the plasma confinement chamber 706 via the one or more fuel gas supply channels 742 (e.g., formed as one or more conduits or pipes). Specifically, the one or more fuel gas supply channels 742 may fluidly couple the plasma confinement chamber 706 to one or more fuel gas sources 746 (e.g., one or more pressurized storage tanks), respectively, the one or more fuel gas sources 746 positioned external to the plasma confinement chamber 706. The fuel gas 744 is depicted as arrows in FIG. 8A, the arrows directed in a flow direction of the fuel gas 744 when the fuel gas 744 is being supplied to the plasma confinement chamber 706 during operation of the thermonuclear fusion reactor 701. The one or more fuel gas sources 746 may contain any remaining portions of the fuel gas 744 (e.g., any remaining fuel gas 744 excepting the portion contained within the one or more fuel gas sources 746), which may be controllably fed to the plasma confinement chamber 706 via actuation of one or more valves 748, respectively (e.g., respectively controlled by one or more corresponding regulators; not shown at FIGS. 8A and 8B). Each of the one or more valves 748 is shown in FIG. 8A in an open position to allow the fuel gas 744 to substantially freely flow to the plasma confinement chamber 706, though each of the one or more valves 748 may also be independently placed in a closed position (see FIG. 8B) to prevent the fuel gas 744 from flowing from the one or more fuel gas sources 746 to the plasma confinement chamber 706. In some embodiments, each of the one or more valves 748 may be continuously variable, such that each of the one or more valves 748 may take on a range of partially open positions which permit greater flow than the closed position and less flow than the open position.

In an example embodiment, the fuel gas 744 may include any gas which may be ionized to form a plasma and which includes nucleons which may undergo thermonuclear fusion under practical conditions (e.g., conditions feasibly attainable in a laboratory or power plant setting). For example, the fuel gas 744 may include one or more of $D_2$ or $T_2$ (e.g., which may ionize to form nucleons which may undergo thermonuclear fusion via reaction (1)).

The liquid metal flow rate may be preselected and/or dynamically adjusted to maintain a predetermined thickness 738 of the protective film 736, e.g., responsive to ablation thereof. For example, the liquid metal flow rate may deviate from the liquid metal ablation rate during operation of the thermonuclear fusion reactor 701, e.g., the liquid metal flow rate may decrease as a result of the electrode 702 swelling due to cumulative neutron damage, the liquid metal ablation rate may decrease/increase responsive to corresponding decreases/increases in the discharge current or an intensity of the plasma arc 708, etc. Accordingly, to maintain the predetermined thickness 738, the liquid metal flow rate and changes thereto may be preselected and/or dynamically adjusted to match the liquid metal ablation rate. In some embodiments, the liquid metal flow rate may be preselected as a single value, which may be dynamically adjusted during operation of the thermonuclear fusion reactor 701. In other embodiments, the liquid metal flow rate may be preselected as a series of values which follow from expected operation of the thermonuclear fusion reactor 701.

In an example embodiment, the liquid metal flow rate may be adjusted responsive to deviating from the liquid metal ablation rate by greater than a threshold magnitude. Additionally or alternatively, an inert gas pressure within the internal reservoir 714 may be adjusted responsive to the liquid metal flow rate deviating from the liquid metal flow rate from the liquid metal ablation rate by greater than the threshold magnitude, where decreasing/increasing the inert gas pressure corresponding decreases/increases the liquid metal flow rate. In certain embodiments, the inert gas pressure may trend upwards (e.g., increase on average) over a lifetime use of the thermonuclear fusion reactor 701 to overcome increased flow resistance within the plurality of internal liquid flow channels 732 as the electrode body 702 swells due to cumulative neutron damage.

As an example, responsive to the liquid metal flow rate being lower than the liquid metal ablation rate by greater than the threshold magnitude, the liquid metal flow rate may be increased by one or more of adjusting the valve 722 from a partially open position or the closed position towards the open position to supply a greater amount of the liquid metal 718 from the liquid metal source 720, adjusting the valve 730 from a partially open position or the closed position towards the open position to supply a greater amount of the inert gas 726 from the inert gas source 728, increasing the heat exchange fluid flow rate in the one or more heat exchange fluid flow channels 740, or increasing heat from the internal heating element/device 743. Additionally or alternatively, responsive to the liquid metal flow rate being lower than the liquid metal ablation rate by greater than the threshold magnitude, the liquid metal ablation rate may be decreased by one or more of decreasing the fuel gas pressure by adjusting at least one of the one or more valves 748 from the open position or a partially open position towards the closed position, or decreasing the discharge current.

As another example, responsive to the liquid metal flow rate being higher than the liquid metal ablation rate by greater than the threshold magnitude, the liquid metal flow rate may be decreased by one or more of adjusting the valve 722 from the open position or a partially open position towards the closed position to supply a lesser amount of the liquid metal 718 from the liquid metal source 720, adjusting the valve 730 from the open position or a partially open position towards the closed position to supply a lesser amount of the inert gas 726 from the inert gas source 728, decreasing the heat exchange fluid flow rate in the one or more heat exchange fluid flow channels 740, or decreasing heat from the internal heating element/device 743. Additionally or alternatively, responsive to the liquid metal flow rate being higher than the liquid metal ablation rate by greater than the threshold magnitude, the liquid metal ablation rate may be increased by one or more of increasing the fuel gas pressure by adjusting at least one of the one or more valves 748 from a partially open position or the closed position towards the open position, or increasing the discharge current.

In some embodiments, a drain or a trough (not shown at FIGS. 8A and 8B) may be fluidically coupled to the plasma confinement chamber 706. Upon ablation of the liquid metal 718 from the external surface 704*a*, at least a portion of the ablated liquid metal 718 may drop or flow into the drain or trough.

Prior to or following operation of the thermonuclear fusion reactor 701, and as shown in FIG. 8B, each of the valves 722, 730, and 748 may be in the closed position. Specifically, the valve 722 may be in the closed position to prevent the liquid metal 718 from flowing from the liquid metal source 720 to the internal reservoir 714, the valve 730 may be in the closed position to prevent the inert gas 726 from flowing from the inert gas source 728 to the internal reservoir 714, and each of the one or more valves 748 may be in the closed position to respectively prevent the fuel gas 744 from flowing from each of the one or more fuel gas sources 746 to the plasma confinement chamber 706.

In some embodiments, the liquid metal 718 may be unable to flow from the internal reservoir 714 to the external surface 704*a* when the liquid metal level 754 reaches or falls below the threshold level 756. Accordingly, and as shown in FIG. 8A, the liquid metal level 754 may be maintained above the threshold level 756 during operation of the thermonuclear fusion reactor 701. However, and as shown in FIG. 8B, responsive to the liquid metal level 754 reaching or falling below the threshold level 756, the thermonuclear fusion reactor 701 may cease operation and no protective film 736 may be formed.

The thermonuclear fusion reactor 701 may include a controller or other computing device 750, which may include non-transitory memory on which executable instructions may be stored. The executable instructions may be executed by one or more processors of the controller 750 to perform various functionalities of the thermonuclear fusion reactor 701. Accordingly, the executable instructions may include various routines for operation, maintenance, and testing of the thermonuclear fusion reactor 701. The controller 750 may further include a user interface at which an operator of the thermonuclear fusion reactor 701 may enter commands or otherwise modify operation of the thermonuclear fusion reactor 701. The user interface may include various components for facilitating operator use of the thermonuclear fusion reactor 701 and for receiving operator inputs (e.g., requests to generate plasma arcs for thermonuclear fusion, etc.), such as one or more displays, input devices (e.g., keyboards, touchscreens, computer mice, depressible buttons, mechanical switches or other depressible actuators, etc.), lights, etc. The controller 750 may be communicably coupled to various components (e.g., valves, power supplies, etc.) of the thermonuclear fusion reactor 701 to command actuation and use thereof (wired and/or wireless communication paths between the controller 750 and the various components are omitted from FIGS. 8A and 8B for clarity). For example, dynamic adjustment of the liquid metal flow rate may be based on one or more inputs (e.g., the liquid metal ablation rate, etc.) received at the controller 750, whereat the one or more inputs may be correlated with one another and/or the liquid metal flow rate (e.g., via one or more neural networks stored in non-transitory memory). Based on the correlation, the controller 750 may output an adjustment to the liquid metal flow rate, which may be carried out via actuation of the various components of the thermonuclear fusion reactor 701 (e.g., to adjust the amount of the liquid metal 718 supplied to the internal reservoir 714, to adjust the amount of the inert gas 726 supplied to the internal reservoir 714, to adjust the heat exchange fluid flow rate, to adjust the heat from the internal heating element/device 743, etc.).

The liquid metal source 720, the inert gas source 728, and the fuel gas sources 746 may be positioned along with various valves (e.g., the valves 722, 730, and 748), control systems (e.g., the controller 750), and other sensitive or complex components at a sufficient distance from the plasma confinement chamber 706 to mitigate component degradation due to high neutron flux during thermonuclear fusion. As such, lengthy piping (e.g., supply channels 716, 724, and 742), wires, cables, and other couplings or communication lines may be extended between the plasma confinement chamber 706 (and the electrode 702 at least partially enclosed therein) and the various sensitive and complex components described above.

As discussed hereinabove, the electrode 702 may be formed in a substantially cylindrical shape having the tapered, rounded nosecone 704. The substantially cylindrical shape (including the nosecone 704) may be radially symmetric with respect to the x-axis, with the cross-section of FIGS. 8A and 8B being taken at a widest portion of the substantially cylindrical shape along the y-axis. Moreover, components depicted in the schematic cross-sectional diagrams of FIGS. 8A and 8B may be replicated about the x-axis so as to be radially symmetrically distributed within one or more planes containing the x-axis. For example, the plurality of internal liquid flow channels 732 and/or the one or more fuel gas supply channels 742 may be regularly spaced about the x-axis (e.g., at an angle, such as 60°, 90°, etc., relative to one another).

Figure 9A:
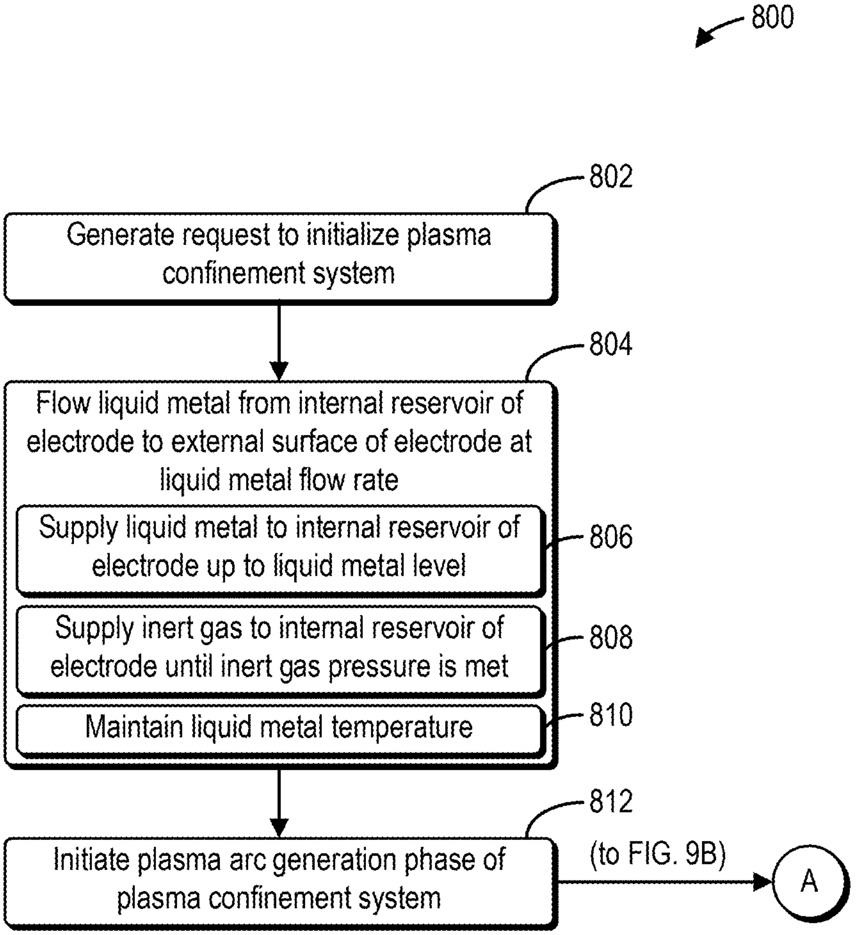
FIGS. 9A and 9B show block diagrams of a method for operating a plasma confinement system including an in situ renewable electrode, in accordance with at least one embodiment.
Figure 9B:
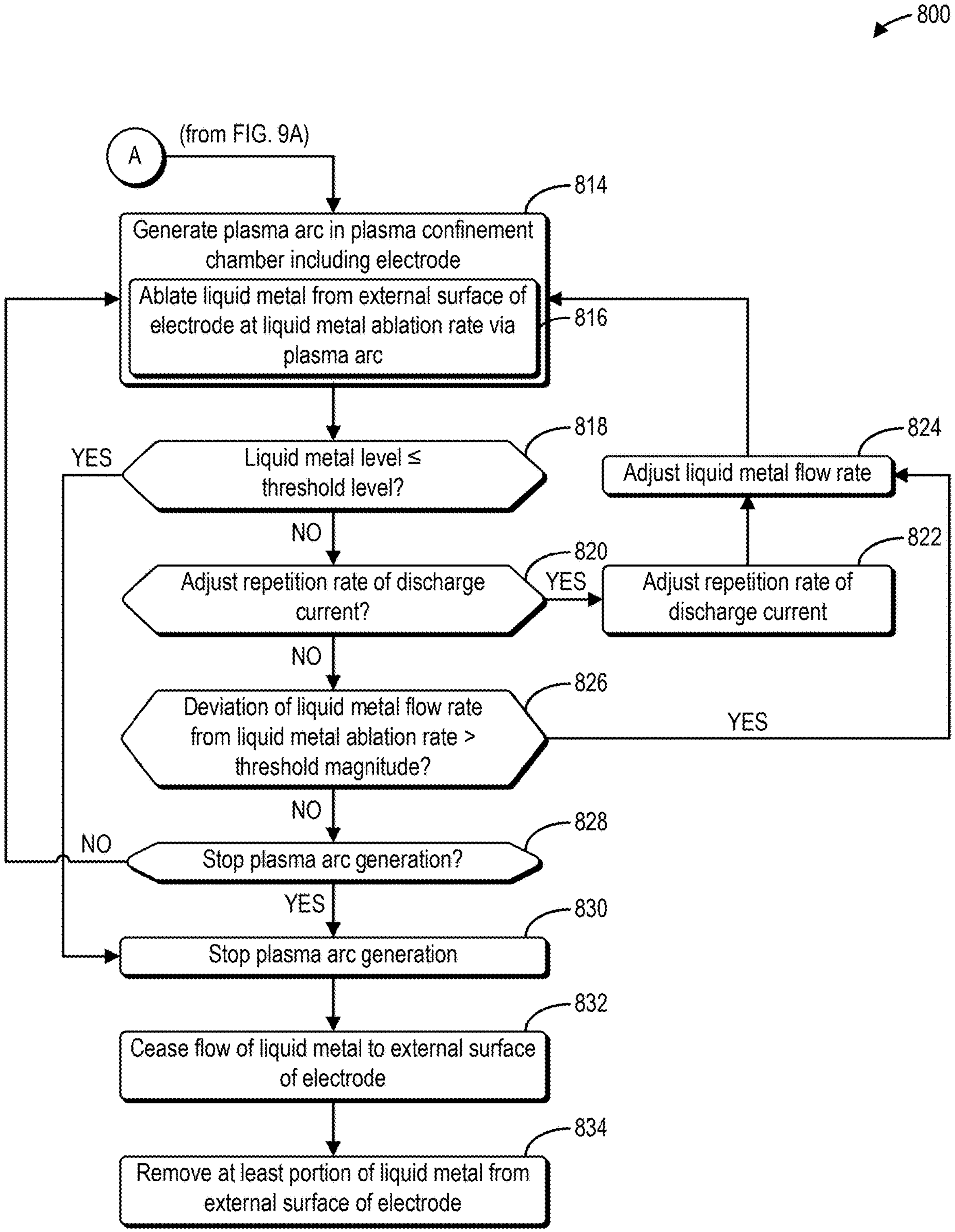

Referring now to FIGS. 9A and 9B, block diagrams of a method 800 for operating a plasma confinement system of a thermonuclear fusion reactor, such as any of the plasma confinement systems described in detail above with reference to FIGS. 1-4, 8A, and 8B, are shown. In an example embodiment, the plasma confinement system may include an in situ renewable electrode including a protective film of a flowing, liquid metal which may ablate from an external surface of the electrode upon interaction with a plasma arc generated by and confined within the plasma confinement system. Specifically, and as described below, the protective film may be continually (e.g., without interruption or with appreciably no delay) replenished responsive to the ablation, such that high-discharge erosion of an external surface of the electrode resulting from the plasma arc interaction may be mitigated or altogether obviated.

In some embodiments, the method 800, or a portion thereof, may be implemented as executable instructions stored in non-transitory memory of a computing device, such as a controller communicably coupled to the plasma confinement system. Moreover, in certain embodiments, additional or alternative sequences of steps may be implemented as executable instructions on such a computing device, where individual steps discussed with reference to the method 800 may be added, removed, substituted, modified or interchanged.

Referring now to FIG. 9A, at block 802, the method 800 may include generating a request to initialize the plasma confinement system, according to which an initialization phase of the plasma confinement system may be initiated. In an example embodiment, the request may be generated responsive to receiving a user input, e.g., from an operator of the plasma confinement system. For instance, initialization of the plasma confinement system may be triggered or otherwise initiated via an operator interacting with a user interface, e.g., a push button switch, toggle switch, or other mechanical actuator, a keyboard, a touchscreen, a cursor input, etc.

At block 804, the method 800 may include flowing the liquid metal from an internal reservoir of the electrode to the external surface of the electrode at a liquid metal flow rate, e.g., during the initialization phase. In an example embodiment, once the liquid metal reaches the external surface, the liquid metal may form a protective film or meniscus between the external surface and a plasma confinement chamber including the electrode (e.g., at and around a central axis of the plasma confinement chamber where the plasma arc, once generated, may interact with the electrode).

The liquid metal flow rate may be preselected, e.g., by the operator of the plasma confinement system, based on one or more operating conditions of the plasma confinement system. For example, the one or more operating conditions may include an inert gas pressure in the internal reservoir, a liquid metal level in the internal reservoir, a liquid metal temperature, an amount of the fuel gas provided to the plasma confinement chamber, a magnitude of a Z-pinch discharge current applied to the plasma (see block 814 below), etc. Specifically, at block 806, the liquid metal may be supplied to the internal reservoir up to the liquid metal level. For example, a first valve opening may be increased to permit the liquid metal to flow into the internal reservoir from a liquid metal source. At block 808, an inert gas may be supplied to the internal reservoir until the inert gas pressure is met. For example, a second valve opening may be increased to permit the inert gas to flow into the internal reservoir from an inert gas source. At block 810, a liquid metal temperature may be maintained, e.g., within the internal reservoir. For example, a heat exchange fluid may be flowed through the electrode, e.g., via a flow channel which may be positioned to transfer heat to and from the liquid metal, and/or adjusting heat from an internal heating coil of the electrode, e.g., which may be positioned within the internal reservoir. In some embodiments, the heat exchange fluid may be flowed through the electrode and/or the internal heating coil may be heated prior to flowing of the liquid metal and generation of the plasma arc so as to preheat the electrode for use. Each of the liquid metal level, the inert gas pressure, and the liquid metal temperature may be preselected upon initiation of the plasma confinement system (e.g., according to the request to initialize the plasma confinement system) and/or dynamically adjusted during operation of the plasma confinement system. In an example embodiment, the liquid metal level, the inert gas pressure, and the liquid metal temperature may be judiciously balanced with one another to attain and maintain the liquid metal flow rate.

At block 812, the method 800 may include initiating a plasma arc generation phase of the plasma confinement system, e.g., following the initialization phase. Specifically, in an example embodiment, the plasma arc generation phase may be initiated at least by powering up the plasma confinement system (e.g., one or more power supplies may supply power to various components utilized during the plasma arc generation phase) and providing fuel gas for forming a plasma to the plasma confinement chamber by increasing one or more third valve openings. In an example embodiment, the fuel gas may include one or more of $D_2$ or $T_2$.

Continuing now to FIG. 9B, at block 814, the method 800 may include generating the plasma arc in the plasma confinement chamber, e.g., during the plasma arc generation phase. In an example embodiment, the Z-pinch discharge current may be applied at a repetition rate between a pair of electrodes, the pair of electrodes including the in situ renewable electrode, to generate the plasma arc. Accordingly, during operation of the plasma confinement system, the in situ renewable electrode may function as either a cathode in some embodiments or an anode in other embodiments. The plasma arc may be confined, compressed, and sustained via an axially symmetric magnetic field generated by the Z-pinch discharge current, with the Z-pinch discharge current stabilized by a sheared ion velocity flow created and maintained via an applied residual current. As a result of the plasma arc generation, the pair of electrodes may be heated and bombarded with deuterium, tritium, and free neutrons (e.g., resulting from thermonuclear fusion within the plasma arc). More specifically, as the Z-pinch discharge current is increased, each of a temperature of the electrode may be increased and an increased amount of deuterium, tritium, and free neutrons may bombard the electrode, for example. However, the in situ renewable electrode may mitigate or altogether obviate erosion of the external surface of the electrode during such bombardment by continually replenishing the external surface of the electrode.

Specifically, at block 816, the method 800 may include ablating the liquid metal from the external surface of the electrode (e.g., rather than the external surface of the electrode itself) at a liquid metal ablation rate via the plasma arc. Specifically, application of the Z-pinch discharge current to the electrode, in addition to neutronic bombardment from the plasma arc in some cases, may result in the ablation of the liquid metal from the external surface of the electrode. The liquid metal may be continually (e.g., without interruption or with no appreciable delay) replenished at the external surface from the internal reservoir.

At block 818, the method 800 may include determining whether the liquid metal level is less than or equal to a threshold level. In an example embodiment, the threshold level may be a level in the internal reservoir at which the liquid metal may no longer be supplied to the external surface at a desired liquid metal flow rate. As such, in some examples, the threshold level may be dynamically adjusted based on desired operation of the plasma confinement system.

If the liquid metal level is greater than the threshold level, the method 800 may proceed to block 820, where the method 800 may include determining whether to adjust the repetition rate of the Z-pinch discharge current, e.g., according to a request generated at the plasma confinement system.

If adjustment to the repetition rate is indicated, the method 800 may proceed to block 822, where the method 800 may include adjusting the repetition rate of the Z-pinch discharge current. In an example embodiment, the repetition rate may be adjusted based on desired power generation, e.g., as indicated in the request to adjust the repetition rate. As an example, the repetition rate may be increased responsive to the request to adjust the repetition rate indicating increased power production. As another example, the repetition rate may be decreased responsive to the request to adjust the repetition rate indicating decreased power production. As such, in such examples, the request to adjust the repetition rate may indicate adjusting the power generation (e.g., a request may be generated to adjust the power generation, which may result in the repetition rate being correspondingly adjusted).

Moreover, the liquid metal ablation rate may be adjusted as a result of the repetition rate being adjusted. As an example, the liquid metal ablation rate may increase (e.g., less of the liquid metal may be retained on the external surface of the electrode) as a result of the repetition rate being increased. As another example, the liquid metal ablation rate may decrease (e.g., more of the liquid metal may be retained on the external surface of the electrode) as a result of the repetition rate being decreased. As such, the request to adjust the repetition rate may indicate adjusting the liquid metal ablation rate (e.g., a request to adjust the liquid metal ablation rate may be generated, which may result in the repetition rate being correspondingly adjusted).

At block 824, the method 800 may include adjusting the liquid metal flow rate. As an example, the liquid metal flow rate may be adjusted responsive to the repetition rate being adjusted (see block 822 above). As another example, the liquid metal flow rate may be adjusted responsive to the liquid metal flow rate deviating from the liquid metal ablation rate by a threshold magnitude (see block 826 below). The liquid metal flow rate may be nonzero prior to and following adjusting the liquid metal flow rate, e.g., as the plasma confinement system may be operating immediately prior to and immediately following block 824. Accordingly, prior to the adjustment, the liquid metal flow rate may be a first nonzero value, and, following the adjustment, the liquid metal flow rate may be second nonzero value, the second nonzero value different from the first nonzero value.

In an example embodiment, adjusting the liquid metal flow rate may include adjusting one or more of the liquid metal level in the internal reservoir, the inert gas pressure in the internal reservoir, or the liquid metal temperature. As an example, increasing the liquid metal flow rate may include increasing one or more of the liquid metal level, the inert gas pressure, or the liquid metal temperature. As another example, decreasing the liquid metal flow rate may include decreasing one or more of the liquid metal level, the inert gas pressure, or the liquid metal temperature. In certain embodiments, adjusting the inert gas pressure may include increasing, on average (e.g., increasing by a net amount), the inert gas pressure over a lifetime use of the electrode, e.g., responsive to cumulative neutron damage swelling the electrode. In certain embodiments, the liquid metal flow rate may be adjusted in a feedforward manner, such that dynamic changes in the plasma confinement system detected during prior use sessions or earlier discharge during the same use session (e.g., after a brief delay, such as 0.5 s) may be accounted for. The method 800 may return to block 814 to continue generating the plasma arc in the plasma confinement chamber.

If no adjustment to the repetition rate is indicated (see block 820 above), the method 800 may proceed to block 826, where the method 800 may include determining whether the liquid metal flow rate has deviated from the liquid metal ablation rate by greater than the threshold magnitude.

In an example embodiment, the liquid metal flow rate may match the liquid metal ablation rate such that the protective film or meniscus on the external surface of the electrode may be maintained at a consistent thickness. Accordingly, if the liquid metal flow rate deviates from the liquid metal ablation rate by greater than the threshold magnitude, the method 800 may proceed to block 824, where the method 800 may include adjusting the liquid metal flow rate (as described above).

If the liquid metal flow rate is maintained within the threshold magnitude of the liquid metal ablation rate, the method 800 may proceed to block 828, where the method 800 may include determining whether to stop the plasma arc generation, e.g., according to a request generated at the plasma confinement system. If no stopping of the plasma arc generation is indicated, the method 800 may return to block 814 to continue generating the plasma arc in the plasma confinement chamber.

If stopping plasma arc generation is indicated or if the liquid metal level is less than or equal to the threshold level (see block 818 above), the method 800 may proceed to block 830, where the method 800 may include stopping plasma arc generation. Specifically, the Z-pinch discharge current may cease being applied to the plasma and the one or more third valve openings may be decreased or altogether closed to reduce or cease supplying the fuel gas to the plasma confinement chamber, such that the plasma arc may become unsustainable and cease.

At block 832, the method 800 may include ceasing flow of the liquid metal, e.g., from the internal reservoir to the external surface of the electrode. For example, the first valve opening may be closed to cease supplying the liquid metal to the internal reservoir and thereby to the external surface. In some embodiments, upon ceasing flow of the liquid metal, the liquid metal may be cleared from the internal reservoir and one or more internal channels fluidly coupled thereto via purging with a gas, e.g., the inert gas.

At block 834, the method 800 may include removing at least a portion of the liquid metal from the external surface of the electrode, e.g., relative to an amount of the liquid metal present during the plasma arc generation phase. In an example embodiment, the liquid metal may be removed by increasing the liquid metal temperature (e.g., by increasing flow of the heat exchange fluid through the electrode and/or by increasing heat from the internal heating coil), such that the liquid metal flow rate may be increased at the external surface (even absent the plasma arc interacting with the external surface). As such, following plasma arc generation and ceasing flow of the liquid metal to the external surface, the liquid metal may flow off of the external surface and collect within the plasma confinement chamber, e.g., within a trough, and/or exit the plasma confinement chamber, e.g., via a drain.

Following liquid metal removal, in some embodiments, a smaller amount of the liquid metal may remain on the external surface of the electrode relative to an amount of the liquid metal present on the external surface during operation of the plasma confinement system. In one embodiment, all or substantially all of the liquid metal is removed from the external surface following liquid metal removal. For example, none of the liquid metal may be visibly present (e.g., to a human eye) on the external surface following liquid metal removal. In an additional or alternative embodiment, a small portion of the liquid metal may be present (e.g., visibly present) on the external surface following liquid metal removal, but not in an amount sufficient to practically affect future operation of the plasma confinement system. In other embodiments, a portion of the liquid metal may be present on the external surface following liquid metal removal, e.g., to protect the body of the electrode from erosion during future operation of the plasma confinement system.

Embodiments of the present disclosure can be described in view of the following clauses:

1. A plasma confinement system, including:

a plurality of electrodes, each electrode of the plurality of electrodes arranged coaxially with respect to an assembly region of the plasma confinement system and positioned so as to be exposed to the assembly region, wherein one or more electrodes of the plurality of electrodes includes an electrode material which releases hydrogen gas above a threshold temperature.

2. The plasma confinement system of clause 1, wherein the plurality of electrodes includes:

a first electrode positioned to define at least a portion of an outer boundary of the assembly region; and a second electrode positioned to define one end of the assembly region.

3. The plasma confinement system of clause 2, wherein the plurality of electrodes further includes a third electrode positioned at a same end of the assembly region defined by the second electrode or an end of the assembly region opposite to the end of the assembly region defined by the second electrode.

4. The plasma confinement system of any one of clauses 2 or 3, wherein the second electrode includes a nosecone exposed to the assembly region so as to be intersected by a plasma arc axis coaxial with each electrode of the plurality of electrodes, and wherein the nosecone includes the electrode material.

5. The plasma confinement system of any one of clauses 1-4, wherein the electrode material includes one or more of a metal deuteride or a metal tritide.

6. The plasma confinement system of clause 5, wherein the one or more of the metal deuteride or the metal tritide includes one or more of Ti, Zr, Sc, Mg, V, $^6$Li, or any alloy formed by any combination of one or more of Ti, Zr, Sc, Mg, V, or $^6$Li.

7. The plasma confinement system of any one of clauses 1-6, wherein the electrode material releases free neutrons upon ionic bombardment of the electrode material.

8. The plasma confinement system of any one of clauses 1-7, wherein the electrode material releases free tritium atoms upon neutronic bombardment of the electrode material.

9. The plasma confinement system of any one of clauses 2, 3, 5, 6, 7, or 8, wherein the second electrode includes:

a nosecone exposed to the assembly region so as to be intersected by a plasma arc axis coaxial with each electrode of the plurality of electrodes, optionally wherein the nosecone includes the electrode material; and a liquid metal, a portion of the liquid metal forming a protective film between a surface of the nosecone and the assembly region during operation of the plasma confinement system.

10. A thermonuclear fusion reactor, including:

a plasma confinement chamber;

an inner electrode; and an outer electrode at least partially surrounding the inner electrode; and wherein one or both of the inner electrode or the outer electrode includes a metal hydride to release a fuel gas between the inner electrode and the outer electrode to contribute plasma to a thermonuclear fusion process of the thermonuclear fusion reactor.

11. The thermonuclear fusion reactor of clause 10, wherein one or both of the inner electrode and the outer electrode includes one or more valves which route additional fuel gas to the plasma confinement chamber during operation of the thermonuclear fusion reactor.

12. The thermonuclear fusion reactor of any one of clauses 10 or 11, wherein the metal hydride decomposes to a metal and the fuel gas when heated to a decomposition temperature.

13. The thermonuclear fusion reactor of clause 12, wherein the metal includes one or more of Ti, Zr, Sc, Mg, V, $^{6}$Li, or any alloy formed by any combination thereof, and wherein the fuel gas includes one or more of $D_2$ or $T_2$.

14. The thermonuclear fusion reactor of any one of clauses 10-13, wherein the metal hydride expels free neutrons upon ionic bombardment with deuterium and/or tritium.

15. The thermonuclear fusion reactor of any one of clauses 10-14, wherein the metal hydride expels free tritium atoms upon neutronic bombardment.

16. A method, including:

generating a thermonuclear fusion reaction in a thermonuclear fusion reactor by:

heating an electrode formed from a bulk material and a metal layer evaporated thereon, the metal layer loaded with deuterium and/or tritium, to cause the electrode to release hydrogen gas;

forming, using the hydrogen gas, plasma inside the thermonuclear fusion reactor; and using electrical current directed into the plasma via the electrode to compress the plasma to produce the thermonuclear fusion reaction.

17. The method of clause 16, wherein the metal layer is evaporated onto the bulk material by masking the bulk material to evaporate the metal layer on only an unmasked portion of the bulk material.

18. The method of any one of clauses 16 or 17, wherein the bulk material forms a shaft ending in a nosecone, and wherein the metal layer is evaporated onto only the nosecone.

19. The method of any one of clauses 16-18, wherein the metal layer includes Ti, Zr, Sc, and/or $^{6}$Li.

20. The method of any one of clauses 16-19, wherein a thickness of the metal layer is less than a millimeter.

21. A plasma confinement system, including:

a plasma confinement chamber; and an electrode body, including:

a nosecone positioned so as to be exposed to the plasma confinement chamber;

an internal reservoir fluidly coupled to a liquid metal source which supplies a liquid metal to the internal reservoir during operation of the plasma confinement system; and a plurality of internal liquid flow channels extending to a surface of the nosecone so as to fluidly couple the internal reservoir to the plasma confinement chamber.

22. The plasma confinement system of clause 21, wherein a first portion of the liquid metal forms a protective film between the surface of the nosecone and the plasma confinement chamber during operation of the plasma confinement system, and wherein a remaining, second portion of the liquid metal is fed from the liquid metal source to the internal reservoir and along the plurality of internal liquid flow channels towards the surface of the nosecone during operation of the plasma confinement system.

23. The plasma confinement system of clause 22, wherein the protective film is maintained at a predetermined thickness during operation of the plasma confinement system.

24. The plasma confinement system of any one of clauses 21-23, wherein the electrode body is formed from one or more of a metal, graphite, or a semiconductor.

25. The plasma confinement system of any one of clauses 21-24, wherein the electrode body is coaxial with a direction of gravity, wherein the nosecone is positioned below the internal reservoir with respect to the direction of gravity, and whereupon extending from the internal reservoir, each internal liquid flow channel of the plurality of internal liquid flow channels is initially oriented upwards and opposite to the nosecone, wherefrom each internal liquid flow channel of the plurality of internal liquid flow channels arches downwards and towards the nosecone.

26. The plasma confinement system of any one of clauses 22-25, wherein:

each internal liquid flow channel of the plurality of internal liquid flow channels includes:

a main liquid flow channel fluidly coupled to and extending from the internal reservoir; and a plurality of liquid flow capillaries which fluidly couples the main liquid flow channel to the plasma confinement chamber, where the protective film is retained on the surface of the nosecone via capillary action induced by the plurality of liquid flow capillaries.

27. The plasma confinement system of any one of clauses 21-26, wherein the electrode body forms one electrode of a plurality of electrodes positioned so as to be exposed to the plasma confinement chamber, and wherein one or more electrodes of the plurality of electrodes includes an electrode material which releases hydrogen gas to be used in plasma generation above a threshold temperature.

28. A thermonuclear fusion reactor, including:

a plasma confinement chamber;

an electrode at least partially enclosed within the plasma confinement chamber, the electrode including a nosecone which intersects with an axis of a plasma arc confined within the plasma confinement chamber during operation of the thermonuclear fusion reactor; and a liquid metal meniscus formed on a surface of the nosecone, the liquid metal meniscus directly interacting with the confined plasma arc during operation of the thermonuclear fusion reactor.

29. The thermonuclear fusion reactor of clause 28, wherein the electrode includes a plurality of internal channels and an internal reservoir, the internal reservoir in fluidic communication with the liquid metal meniscus via at least a first portion of the plurality of internal channels.

30. The thermonuclear fusion reactor of clause 29, wherein a second portion of the plurality of internal channels supplies a fuel gas to the plasma confinement chamber.

31. The thermonuclear fusion reactor of any one of clauses 29 or 30, wherein a third portion of the plurality of internal channels contains a heat exchange fluid which maintains a temperature of the electrode and/or the liquid metal meniscus.

32. The thermonuclear fusion reactor of any one of clauses 29-31, further including a first supply channel fluidly coupling the internal reservoir to a liquid metal source, the liquid metal source positioned external to the plasma confinement chamber.

33. The thermonuclear fusion reactor of clause 32, further including a second supply channel fluidly coupling the internal reservoir to an inert gas source, the inert gas source positioned external to the plasma confinement chamber.

34. A method, including:

flowing a liquid metal from an internal reservoir of an electrode to an external surface of the electrode at a liquid metal flow rate;

generating a confined plasma arc to ablate the liquid metal from the external surface at a liquid metal ablation rate; and responsive to the liquid metal flow rate deviating from the liquid metal ablation rate by greater than a threshold magnitude, adjusting the liquid metal flow rate by adjusting one or more of a liquid metal level in the internal reservoir, an inert gas pressure in the internal reservoir, or a liquid metal temperature.

35. The method of clause 34, wherein flowing the liquid metal at the liquid metal flow rate includes:

supplying the liquid metal to the internal reservoir up to the liquid metal level; and supplying an inert gas to the internal reservoir until the inert gas pressure is met.

36. The method of any one of clauses 34 or 35, wherein flowing the liquid metal at the liquid metal flow rate includes maintaining the liquid metal temperature by flowing a heat exchange fluid through the electrode and/or adjusting heat from an internal heating coil of the electrode.

37. The method of any one of clauses 34-36, wherein adjusting the inert gas pressure includes increasing, on average, the inert gas pressure over a lifetime use of the electrode.

38. The method of any one of clauses 34-37, wherein the liquid metal flow rate is nonzero prior to and following adjusting the liquid metal flow rate.

39. The method of any one of clauses 34-38, further including:

responsive to the liquid metal level being less than or equal to a threshold level:

ceasing flow of the liquid metal from the internal reservoir; and removing at least a portion of the liquid metal from the external surface by increasing the liquid metal temperature.

40. The method of any one of clauses 34-39, further including adjusting the liquid metal ablation rate by adjusting a repetition rate of a discharge current sustaining the confined plasma arc.

The specification and drawings are to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed but, on the contrary, the intention is to cover all modifications, alternative constructions, and equivalents falling within the spirit and scope of the invention, as defined in the appended claims.

The use of the terms “a” and “an” and “the” and similar referents in the context of describing the disclosed embodiments (especially in the context of the following claims) are to be construed to cover both the singular and the plural, unless otherwise indicated herein or clearly contradicted by context. Similarly, use of the term “or” is to be construed to mean “and/or” unless contradicted explicitly or by context. The terms “comprising,” “having,” “including,” and “containing” are to be construed as open-ended terms (i.e., meaning “including, but not limited to,”) unless otherwise noted. The term “connected,” when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. The use of the term “set” (e.g., “a set of items”) or “subset” unless otherwise noted or contradicted by context, is to be construed as a nonempty collection comprising one or more members. Further, unless otherwise noted or contradicted by context, the term “subset” of a corresponding set does not necessarily denote a proper subset of the corresponding set, but the subset and the corresponding set may be equal. The use of the phrase “based on,” unless otherwise explicitly stated or clear from context, means “based at least in part on” and is not limited to “based solely on.”

Conjunctive language, such as phrases of the form “at least one of A, B, and C,” or “at least one of A, B and C,” (i.e., the same phrase with or without the Oxford comma) unless specifically stated otherwise or otherwise clearly contradicted by context, is otherwise understood within the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases “at least one of A, B, and C” and “at least one of A, B and C” refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple “A”). Thus, such conjunctive language is not generally intended to imply that certain embodiments require at least one of A, at least one of B and at least one of C each to be present. Similarly, phrases such as “at least one of A, B, or C” and “at least one of A, B or C” refer to the same as “at least one of A, B, and C” and “at least one of A, B and C” refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media, and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, in an embodiment, a non-transitory computer-readable storage medium stores instructions and a main CPU executes some of the instructions while a graphics processor unit executes other instructions. In another embodiment, different components of a computer system have separate processors and different processors execute different subsets of the instructions.

Accordingly, in an embodiment, computer systems are configured to implement one or more services that singly or collectively perform operations of processes described herein, and such computer systems are configured with applicable hardware and/or software that enable the performance of the operations. Further, a computer system, in an embodiment of the present disclosure, is a single device and, in another embodiment, is a distributed computer system comprising multiple devices that operate differently such that the distributed computer system performs the operations described herein and such that a single device does not perform all operations.

The use of any and all examples or exemplary language (e.g., "such as") provided herein is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate, and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references including publications, patent applications, and patents cited herein are hereby incorporated by reference to the same extent as if each reference were individually and specifically indicated to be incorporated by reference and were set forth in its entirety herein.

The invention claimed is:

1. A method, comprising:

flowing a liquid metal, at a liquid metal flow rate, from an internal reservoir of an electrode to an external surface of the electrode, the electrode extending axially within a plasma confinement chamber;

generating, within the plasma confinement chamber, a confined plasma that is to ablate the liquid metal from the external surface at a liquid metal ablation rate; and responsive to the liquid metal flow rate deviating from the liquid metal ablation rate by greater than a threshold magnitude, adjusting the liquid metal flow rate by adjusting one or more of a liquid metal level in the internal reservoir, an inert gas pressure in the internal reservoir, or a liquid metal temperature.

2. The method of claim 1, wherein flowing the liquid metal at the liquid metal flow rate comprises:

supplying the liquid metal to the internal reservoir up to the liquid metal level; and supplying an inert gas to the internal reservoir until the inert gas pressure is met.

3. The method of claim 1, wherein flowing the liquid metal at the liquid metal flow rate comprises maintaining the liquid metal temperature by flowing a heat exchange fluid through the electrode and/or adjusting heat from an internal heating coil of the electrode.

4. The method of claim 1, wherein adjusting the inert gas pressure comprises increasing, on average, the inert gas pressure over a lifetime use of the electrode.

5. The method of claim 1, wherein the liquid metal flow rate is nonzero prior to and following adjusting the liquid metal flow rate.

6. The method of claim 1, further comprising:

responsive to the liquid metal level being less than or equal to a threshold level:

ceasing flow of the liquid metal from the internal reservoir; and removing at least a portion of the liquid metal from the external surface by increasing the liquid metal temperature.

7. The method of claim 1, further comprising adjusting the liquid metal ablation rate by adjusting a repetition rate of a discharge current sustaining the confined plasma.

8. The method of claim 6, further comprising, upon ceasing the flow of the liquid metal from the internal reservoir responsive to the liquid metal level being less than or equal to the threshold level, clearing at least a portion of the liquid metal within the internal reservoir via purging with a gas.

9. The method of claim 1, wherein the liquid metal flows to the external surface via a plurality of internal liquid flow channels positioned within the electrode, the plurality of internal liquid flow channels fluidically coupling the internal reservoir to the external surface.

10. The method of claim 9, wherein, upon flowing the liquid metal from the internal reservoir to the external surface, a first portion of the liquid metal forms a protective film between the external surface and the plasma confinement chamber, and wherein a remaining, second portion of the liquid metal flows from the internal reservoir and along the plurality of internal liquid flow channels towards the external surface.

11. The method of claim 10, wherein adjusting the liquid metal flow rate responsive to the liquid metal flow rate deviating from the liquid metal ablation rate by greater than the threshold magnitude maintains the protective film at a consistent thickness.

12. The method of claim 11, further comprising setting a predetermined value corresponding to the consistent thickness of the protective film.

13. The method of claim 10, wherein each internal liquid flow channel of the plurality of internal liquid flow channels comprises:

a main liquid flow channel fluidly coupled to and extending from the internal reservoir; and a plurality of liquid flow capillaries that fluidly couple the main liquid flow channel to the plasma confinement chamber, where the protective film is retained on the external surface via capillary action induced by the plurality of liquid flow capillaries.

14. The method of claim 1, wherein the electrode is positioned so as to expose the external surface to the plasma confinement chamber, and wherein the electrode comprises a Ti-based material that is to release hydrogen gas, above a threshold temperature, to be used in the generation of the confined plasma.

15. The method of claim 1, wherein the electrode comprises one or more of a metal, graphite, or a semiconductor.

16. The method of claim 1, wherein the internal reservoir is positioned with respect to the external surface such that gravitational force assists in increasing the liquid metal flow rate as the liquid metal flows from the internal reservoir to the external surface.

17. The method of claim 1, further comprising setting a preselected value, of the liquid metal flow rate, at which to flow the liquid metal from the internal reservoir to the external surface.

18. The method of claim 17, wherein the preselected value is based on the inert gas pressure in the internal reservoir, the liquid metal level in the internal reservoir, the liquid metal temperature, an amount of fuel gas provided to the plasma confinement chamber, and/or a magnitude of a discharge current to be applied to sustain the plasma.

19. The method of claim 1, wherein generating the confined plasma comprises:

providing, to the plasma confinement chamber, the plasma that is to be confined or a fuel gas that is to be converted into the plasma; and applying a Z-pinch discharge current within the plasma confinement chamber to confine the plasma as a Z-pinch plasma.

20. The method of claim 1, further comprising continually replenishing the external surface with the liquid metal as the confined plasma ablates the liquid metal.

* * * * *